(12) United States Patent
Abbott et al.

(10) Patent No.: US 8,015,480 B2
(45) Date of Patent: * Sep. 6, 2011

(54) SYSTEM AND METHOD FOR MEDIA STREAM INDEXING AND SYNCHRONIZATION

(75) Inventors: Michael J. Abbott, Sunnyvale, CA (US); Paul Close, Mountain View, CA (US); Kevin P. Smith, Mountain View, CA (US)

(73) Assignee: Espial, Inc., Ottawa (CA)

( * ) Notice: Subject to any disclaimer, the term of this patent is extended or adjusted under 35 U.S.C. 154(b) by 960 days.

This patent is subject to a terminal disclaimer.

(21) Appl. No.: 11/803,930

(22) Filed: May 15, 2007

(65) Prior Publication Data

US 2008/0010658 A1    Jan. 10, 2008

Related U.S. Application Data

(60) Continuation of application No. 11/219,341, filed on Sep. 2, 2005, now Pat. No. 7,272,780, which is a continuation of application No. 10/677,581, filed on Oct. 1, 2003, now Pat. No. 6,941,508, which is a division of application No. 09/399,777, filed on Sep. 21, 1999, now Pat. No. 6,654,933, which is a continuation of application No. 08/829,283, filed on Mar. 31, 1997, now Pat. No. 5,973,679.

(51) Int. Cl.
*G06F 17/00* (2006.01)

(52) U.S. Cl. ......... 715/201; 715/202; 715/203; 715/204

(58) Field of Classification Search .................. 715/201, 715/202, 203, 204
See application file for complete search history.

(56) References Cited

U.S. PATENT DOCUMENTS

| | | |
|---|---|---|
| 1,868,601 A | 7/1932 | Harris |
| 2,839,185 A | 6/1958 | Isaacs |
| 4,161,075 A | 7/1979 | Eubanks et al. |
| 4,258,843 A | 3/1981 | Wymer |
| 4,437,618 A | 3/1984 | Boyle |
| 5,202,961 A | 4/1993 | Mills et al. |
| 5,247,676 A | 9/1993 | Ozur et al. |

(Continued)

FOREIGN PATENT DOCUMENTS

JP          10-294493          11/1998

OTHER PUBLICATIONS

Ackermann, P., "Direct Manipulation of Temporal Structures in a Mutimedia Application Framework", Proceedings of the Second ACM International Conference on Multimedia, 1994, pp. 51-58.

(Continued)

*Primary Examiner* — Stephen S Hong
*Assistant Examiner* — Matthew J Ludwig
(74) *Attorney, Agent, or Firm* — Michael Haynes PLC; Michael N. Haynes

(57) ABSTRACT

An indexing system and method for allowing a viewer to control the mode of delivery of program material. By mapping from time to data position, data delivery can begin at any selected time in the program material. The indexing method also provides for controlling data delivery to begin at the beginning of a frame of data. A synchronizing method is provided to minimize a time offset between audio and video data, particularly in environments using groups of pictures.

13 Claims, 8 Drawing Sheets

U.S. PATENT DOCUMENTS

| | | |
|---|---|---|
| 5,253,275 A | 10/1993 | Yurt et al. |
| 5,263,165 A | 11/1993 | Janis |
| 5,267,351 A | 11/1993 | Reber et al. |
| 5,276,861 A | 1/1994 | Howarth |
| 5,276,876 A | 1/1994 | Coleman et al. |
| 5,317,568 A | 5/1994 | Bixby et al. |
| 5,325,297 A | 6/1994 | Bird et al. |
| 5,341,477 A | 8/1994 | Pitkin et al. |
| 5,369,570 A | 11/1994 | Parad |
| 5,388,264 A | 2/1995 | Tobias, II et al. |
| 5,390,138 A | 2/1995 | Milne et al. |
| 5,392,432 A | 2/1995 | Engelstad et al. |
| 5,414,455 A | 5/1995 | Hooper et al. |
| 5,430,876 A | 7/1995 | Schreiber et al. |
| 5,434,678 A | 7/1995 | Abecassis |
| 5,442,390 A | 8/1995 | Hooper et al. |
| 5,442,791 A | 8/1995 | Wrabetz et al. |
| 5,446,901 A | 8/1995 | Owicki et al. |
| 5,455,932 A | 10/1995 | Major et al. |
| 5,459,871 A | 10/1995 | Van Den Berg |
| 5,461,611 A | 10/1995 | Drake, Jr. et al. |
| 5,463,625 A | 10/1995 | Yasrebi |
| 5,467,288 A | 11/1995 | Fasciaro et al. |
| 5,475,819 A | 12/1995 | Miller et al. |
| 5,485,611 A | 1/1996 | Astle |
| 5,485,613 A | 1/1996 | Engelstad et al. |
| 5,491,797 A | 2/1996 | Thompson et al. |
| 5,491,800 A | 2/1996 | Goldsmith et al. |
| 5,515,490 A | 5/1996 | Buchanan et al. |
| 5,519,863 A | 5/1996 | Allen et al. |
| 5,537,528 A | 7/1996 | Takahashi et al. |
| 5,548,723 A | 8/1996 | Pettus |
| 5,550,965 A | 8/1996 | Gabbe et al. |
| 5,553,221 A | 9/1996 | Reimer et al. |
| 5,557,785 A | 9/1996 | Lacquit et al. |
| 5,559,608 A | 9/1996 | Kunihiro |
| 5,559,949 A | 9/1996 | Reimer et al. |
| 5,559,955 A | 9/1996 | Dev et al. |
| 5,561,769 A | 10/1996 | Kumar et al. |
| 5,568,181 A | 10/1996 | Greenwood et al. |
| 5,581,703 A | 12/1996 | Baugher et al. |
| 5,584,006 A | 12/1996 | Reber et al. |
| 5,586,264 A | 12/1996 | Belknap et al. |
| 5,596,720 A | 1/1997 | Hamada et al. |
| 5,602,582 A | 2/1997 | Wanderscheid et al. |
| 5,602,850 A | 2/1997 | Wilkinson et al. |
| 5,603,058 A | 2/1997 | Belknap et al. |
| 5,623,699 A | 4/1997 | Blakeslee |
| 5,630,067 A | 5/1997 | Kindell et al. |
| 5,630,121 A | 5/1997 | Braden-Harder et al. |
| 5,633,999 A | 5/1997 | Clowes et al. |
| 5,640,388 A | 6/1997 | Woodhead et al. |
| 5,644,715 A | 7/1997 | Baugher |
| 5,682,597 A | 10/1997 | Ganek et al. |
| 5,694,548 A | 12/1997 | Baugher et al. |
| 5,701,465 A | 12/1997 | Baugher et al. |
| 5,712,976 A | 1/1998 | Falcon, Jr. et al. |
| 5,724,605 A | 3/1998 | Wissner |
| 5,737,747 A | 4/1998 | Vishlitzky et al. |
| 5,751,280 A | 5/1998 | Abbott et al. |
| 5,758,078 A | 5/1998 | Kurita et al. |
| 5,778,181 A | 7/1998 | Hidary et al. |
| 5,790,795 A | 8/1998 | Hough |
| 5,801,781 A | 9/1998 | Hiroshima et al. |
| 5,805,821 A | 9/1998 | Saxena et al. |
| 5,819,019 A | 10/1998 | Nelson |
| 5,877,812 A | 3/1999 | Krause et al. |
| 5,892,767 A | 4/1999 | Bell et al. |
| 5,892,913 A | 4/1999 | Adiga et al. |
| 5,920,700 A | 7/1999 | Gordon et al. |
| 5,925,104 A | 7/1999 | Elbers et al. |
| 5,926,649 A | 7/1999 | Ma et al. |
| 5,928,330 A | 7/1999 | Goetz et al. |
| 5,930,797 A | 7/1999 | Hill |
| 5,933,849 A | 8/1999 | Srbljic et al. |
| 5,953,506 A | 9/1999 | Kalra et al. |
| 5,973,679 A | 10/1999 | Abbott et al. |
| 5,996,025 A | 11/1999 | Day et al. |
| 6,006,264 A | 12/1999 | Colby et al. |
| 6,014,694 A | 1/2000 | Aharoni et al. |
| 6,018,619 A | 1/2000 | Allard et al. |
| 6,026,425 A | 2/2000 | Suguri et al. |
| 6,031,960 A | 2/2000 | Lane |
| 6,034,746 A | 3/2000 | Desai et al. |
| 6,094,706 A | 7/2000 | Factor et al. |
| 6,119,167 A | 9/2000 | Boyle et al. |
| 6,131,095 A | 10/2000 | Low et al. |
| 6,134,315 A | 10/2000 | Galvin |
| 6,137,834 A | 10/2000 | Wine et al. |
| 6,154,778 A | 11/2000 | Koistinen et al. |
| 6,185,625 B1 | 2/2001 | Tso et al. |
| 6,223,210 B1 | 4/2001 | Hickey |
| 6,230,200 B1 | 5/2001 | Forecast et al. |
| 6,240,243 B1 | 5/2001 | Chen et al. |
| 6,279,040 B1 | 8/2001 | Ma et al. |
| 6,281,524 B1 | 8/2001 | Yamamoto et al. |
| 6,343,298 B1 | 1/2002 | Savchenko et al. |
| 6,356,921 B1 | 3/2002 | Kumar et al. |
| 6,377,996 B1 | 4/2002 | Lumelsky et al. |
| 6,553,413 B1 | 4/2003 | Leighton et al. |
| 6,567,409 B1 | 5/2003 | Tozaki et al. |
| 6,584,463 B2 | 6/2003 | Morita et al. |
| 6,601,136 B2 | 7/2003 | Gunaseelan et al. |
| 6,654,933 B1 | 11/2003 | Abbott et al. |
| 6,661,430 B1 | 12/2003 | Brewer et al. |
| 6,708,213 B1 | 3/2004 | Bommaiah et al. |
| 6,717,591 B1 | 4/2004 | Fiveash et al. |
| 6,728,270 B1 | 4/2004 | Meggers et al. |
| 6,754,443 B2 | 6/2004 | Nelson et al. |
| 6,757,736 B1 | 6/2004 | Hutchison et al. |
| 6,771,644 B1 | 8/2004 | Brassil et al. |
| 6,831,394 B2 | 12/2004 | Baumgartner et al. |
| 6,868,452 B1 | 3/2005 | Eager et al. |
| 7,107,606 B2 | 9/2006 | Lee |
| 7,125,383 B2 | 10/2006 | Hoctor et al. |
| 7,272,780 B2 * | 9/2007 | Abbott et al. .................. 715/203 |
| 2002/0010798 A1 | 1/2002 | Ben-Shaul et al. |
| 2002/0038374 A1 | 3/2002 | Gupta et al. |
| 2002/0040403 A1 | 4/2002 | Goldhor et al. |
| 2002/0049846 A1 | 4/2002 | Horen et al. |
| 2002/0065925 A1 | 5/2002 | Kenyon et al. |
| 2002/0078203 A1 | 6/2002 | Greschler et al. |
| 2002/0103928 A1 | 8/2002 | Singal et al. |
| 2002/0152318 A1 | 10/2002 | Menon et al. |
| 2002/0161868 A1 | 10/2002 | Paul et al. |
| 2003/0018978 A1 | 1/2003 | Singal et al. |
| 2003/0187811 A1 | 10/2003 | Chang et al. |

OTHER PUBLICATIONS

Blakowski et al., "Tool Support for the Synchronization and Presentation of Distributed Multimedia", Computer Communications. Dec. 1992, 15(10): 611-618.

Bulterman et al., "A Structure for Transportable, Dynamic Multimedia Documents", USENIX Summer '91, Jun. 1991, pp. 137-155.

Gibbs, et al., "An Object-Oriented Framework for Multimedia Composition and Synchronization", Multimedia: Systems, Interaction, and Applications, L. Kjelldahl (ed.), Apr. 1990, pp. 101-111.

Yoshida, J., "MIPS Magic Carpet Takes Set-Top-Box Ride", Electronic Engineering Times, May 1995, Issue 846, pp. 1 and 114.

Hamakawa, R., "Object Composition and Playback Models for Handling Multimedia Data", ACM Proceedings of the Conference on Multimedia, 1992, pp. 273-281.

Hirzalla, N., et al., "A Temporal Model for Interactive Multimedia Scenarios", IEEE MultiMedia, 1995, 2(3), pp. 24-31.

Little, "Interval-based Conceptual Models for Time-Dependent Multimedia Data", IEEE Transaction on Knowledge and Data Engineering, 5(4): Aug. 1993, pp. 551-563.

Little, et al., "Multimedia Object Models for Synchronization and Database", Sixth Int'l Conf. on Data Engineering, Feb. 1990, pp. 20-27.

Meira, et al., "A Scripting Language for Multimedia Presentations", Proc. of Int'l Conf. on Multimedia Computing and Systems, May 1994, pp. 484-489.

Shenchange, E., "QuickTime.RTM. VR—An Image-Based Approach to Virtual Environment Navigation", Computer Graphics Proceedings, Annual Conference Series, Aug. 1995, pp. 29-38.

Stotts et al., "Temporal Hyperprogramming", Journal of Visual Languages and Computing, vol. 1, Jun. 1990, pp. 237-253.
Ackermann, P., "Direct manipulation of temporal structures in a multimedia application framework", Proc. 2nd ACM Intl Conf on Multimedia. 1994 (pp. 51-58).
Bommaiah et al., "Design and implementation of a caching system for streaming media over the internet" Proc Real-Time Technology & Applications Symposium 2000 (pp. 111-121).
Brumley, D. et al. "Remote timing attacks are practical" Proc 12th Usenix Security Symposium, 2003.
Byrne, K. "Evaluating jukebox performance" *The Practical Engineer* )IEEE Spectrum Jul. 1997.
Chandra, R. et al. "The collective: a cache-based system management architecture" (2nd Symp.on Networked Sys. Design & Implementation (May 2005), Boston MA.
Chow, J. et al. "Understanding data lifetime via whole system simulation" Proc 2004 Usenix Security Symposium.
Crutcher et al., "The networked video jukebox" IEEE Transactions on Circuits & Systems for Video Tech. vol. 4 No. 2, Apr. 1994.
Eitel, P. "Backup and storage management in distributed heterogeneous environments" 13th IEEE Symp. on Mass Storage Systems (1994) pp. 124-125.
Elrad, T. et al. "Developing secure applications through aspect-oriented programming" Addison-Wesley (Sample chapter from *Aspect Oriented Software Development* Nov. 2004.
Fan, et al, Sumary cache: a scalable wide-area web cache sharing protocol Technical Report 1361, Dept Computer Science, Univ Wisconsin-Madison, Feb. 1998.
Ford, D. et al. "Redundant arrays of independent libraries (RAIL): a tertiary storage system" 1996 IEEE Proc. of COMPCON '96 (pp. 280-285).
GreenBorder: About Us. http://www.greenborder.com/about/ (Jan. 2006).
GreenBorder offers security 'barrier' for IE, Outlook (Computerworld) Mar. 2005.
Grizzard, J. et al. "Towards an approach for automatically repairing compromised network systems"; Network Computing and Applications, 2004. (NCA 2004). Proceedings. Third IEEE International Symposium (Aug.-Sep. 1, 2004) pp. 389-382.
Gruber et al., "Protocol considerations for a prefix-caching proxy for multimedia streams" Computer Networks 33, pp. 657-668 (2000).
Hamakawa, R. et al. "Object composition and playback models for handling multimedia data" Springer-Verlag New York, Inc. (1994).
Hirzalla, N. et al. "A temporal model for interactive multimedia scenarios", IEEE MultiMedia, 1995 (pp. 24-31).
Jun, S. et al. "Video allocation methods in a multi-level server for large-scale VOD services" 1998 IEEE.
Little, "Interval-based conceptual models for time-dependent multimedia data", IEEE Transactions on Knowledge and Data Engineering, 5(4): 551-563 (1993).
Li, N. et al. "Oblivious signature-based envelope" *Proceedings of the 22nd ACM Symposium on Principles of Distributed Computing (PODC 2003)*, Boston, Massachusetts, Jul. 2003.
Ludescher, C. et al. "File storage management for TFTR physics data" 1992 IEEE (pp. 856-859).
Microsoft TechNet "Server and domain isolation using IPsec and group policy" (Mar. 2005).
Nahrstedt, K., "The qos broker" IEEE Multimedia, Spring 1995.
nCube: N4 Streaming Media System http://www.ncube.com (Nov. 2000).
Nelson et al., MediaBase: Streaming Media Serving for the Web, pp. 1-28 (1997).
Nelson et al. "A highly available, scalable ITV system" Assoc. for Comp. Mach. (ACM) 1995.
Oracle9i Real application clusters:cache fusion delivers scalability. Oracle White Paper (May 2001).
Pratt et al. "Arsenic: a user-accessible gigabit ethernet interface". Proc. IEEE Infocom (2001).
Rajae et al., "Multimedia proxy caching mechanism for quality adaptive streaming applications in the internet" IEEE Infocom 2000 (pp. 980-989).
RealNetworks Documentation Library. http://service.real.com/help.library/earlier.html (Dec. 2004).
RealNetworks, "RealServer Administration Guide," Dec. 13, 1999, http://service.real.com/help/library/guides/g270/realsvr.htm, Ch. 13, 14.
RealNetworks, "RealSystem G2 Production Guide," Mar. 22, 2000, http://service.real.com/help/library/guides/productiong27/realpgd.htm, Ch. 3,7.
Rothermel, K. "QoS negotiation and resource reservations for distributed multimedia applications" Proc IEEE Intl Conf on Multimedia Computing & Systems Jun. 1997 (pp. 319-326).
Ruwase, O. "A practical dynamic buffer overflow detector". Stanford Univ. 2004.
Sapuntzakis, C. et al., "Optimizing the migration of virtual computers" Stanford Univ (also, Proc 5th Op Sys Design and Implementation, Boston, MA, Dec. 2002).
Sapuntzakis, C. et al.,"Virtual appliances for deploying and maintaining software" Stanford Univ. Computer Systems Lab. 2003.
Schmidt, B. "Supporting ubiquitous computing with stateless consoles and computation caches". Stanford University Aug. 2000.
Schmidt, B. et al. "The interactive performance fo SLIM: a stateless, thin-client architecture" Op. Syst. Rev. 34(5):32-47, Dec. 1999.
SeaChange Media Cluster "New paradigm for digital video storage and delivery" whitepaper. Aug. 2002. www.seachangeinternational.com/downloads/broadcast/mediacluster/mediacluster%.
Sen, S. "Proxy prefix caching for multimedia streams" IEEE 1999.
Shenchang, E. "An image-basead approach to virtual environment navigation" Proc. SIGGRAPH 95 (pp. 29-38) 1995.
Stanford Collective Group: a virtual appliance computing infrastructure. Jan. 2006. http://suif.stanford.edu/collective/index.html.
StreamWorks Server, May 8, 1997.
WebTheater 2 Product Datasheet, 1997.
WebForce Media Server, Aug. 15, 1996.
WebForce MediaBase—Mediabase 2.0 Brochure, 1997.
Wessels, D. et al., Internet Cache Protocol (ICP), v.2, Sep. 1997.
Yoshida, J., "MIPS Magic Carpet Takes Set-Top-Box Ride", EE Times, May 1995.
Zhang, et al., "RSVP: a new resource reservation protocol", IEEE Network, vol. 7, No. 5, pp. 8-18, (Sep. 1993).
Zeichik, Isolation and protection: Intel's lagrande vision for trusted virtualization, Nov. 2005. http://222.devx.com/Intel/Article/30008.

\* cited by examiner

US 8,015,480 B2

SYSTEM AND METHOD FOR MEDIA STREAM INDEXING AND SYNCHRONIZATION

CROSS-REFERENCE TO RELATED APPLICATIONS

This application is a continuation of U.S. patent application Ser. No. 11/219,341 filed 2 Sep. 2005 and now U.S. Pat. No. 7,272,780 which issued 18 Sep. 2007; and which application is a continuation of U.S. patent application Ser. No. 10/677,581 filed Oct. 1, 2003 and now U.S. Pat. No. 6,941, 508; which is a divisional of U.S. application Ser. No. 09/399, 777 filed Sep. 21, 1999 and now U.S. Pat. No. 6,654,933; which is a continuing application of U.S. patent application Ser. No. 08/829,283, filed Mar. 31, 1997, now U.S. Pat. No. 5,973,679 which issued Oct. 26, 1999; each of which applications are hereby incorporated by reference.

BACKGROUND OF THE INVENTION

1. Field of the Invention

The present invention relates generally to media delivery systems. More particularly, the present invention relates to a system and method for implementing interactive media delivery. Still more particularly, the present invention relates to a system and method for media stream indexing and synchronization.

2. Related Art

Recent advances in data handling and data communications techniques have enabled the entertainment industry to provide movies and other audio, video, or multi-media program materials to viewers in a viewer's home at a time requested by the viewer. Such services are referred to as "video-on-demand" (VOD) services. Video-on-demand services allow a viewer to request and receive program materials at the viewer's television set at a time specified by the viewer.

However, conventional video-on-demand services have limited ability or flexibility to customize program materials transmitted to the viewer. Typically, program materials are stored in a format such that they cannot easily be edited, modified, or packaged in a customized manner by the video-on-demand service provider. Because of this limited flexibility, the VOD service provider has a limited range or variety of products that can be offered to the viewer.

This limited flexibility often results in a less than optimal mix of program material being transmitted to the viewer, with less than optimal use of available bandwidth. For example, a VOD service provider may be unable to provide additional program material desired by a particular viewer, such as closed-captioning text. Alternatively, the VOD service provider may be unable to modify program material transmitted to the viewer to better suit the needs of the viewer, such as transmitting the audio program material in an alternative language. Finally, the VOD service provider may be wasting bandwidth by transmitting program material, such as closed-captioning text, that a particular viewer may not be using.

In addition, conventional video-on-demand services do not offer interactive capabilities to the viewer. Once the viewer orders a program, the program is delivered (e.g., transmitted) to the viewer's television set for display at the specified time. The viewer has no control over the program material while it is airing. For instance, the viewer cannot pause, fast-forward or rewind the program. All the viewer can do is watch the program as it is delivered, and, as such, the conventional video-on-demand system is not interactive.

SUMMARY OF THE INVENTION

The present invention is directed to a hierarchical structure used for storage and delivery of program materials such as video and other media. In this document, the terms "program", "program material", and "program content" are used generally to refer to media provided to a viewer, such as audio, video, multi-media, or other types of material intended for listening and/or viewing by the viewer.

According to the invention, a hierarchy of object types is used to format or arrange the program material that is transmitted to an individual viewer. The objects include: an atom; a segment; a series; and a group. An atom contains the program material in the form of data, preferably encoded data, that is stored on a storage device or other memory means. The object hierarchy of the present invention is generally defined as follows: a group is comprised of one or more series; a series is comprised of one or more segments; and a segment identifies or references a portion of an atom, such as the data contained in an atom that occurs between two points in time. As such, a segment may identify all or part of an atom.

In one embodiment of the present invention, a method is provided for locating program material so that delivery of the program material to a viewer begins at a specified time T in the program material. This indexing method of the present invention includes accessing a group having one or more series, each series having one or more segments that references a corresponding atom containing media data representing the program material.

This indexing method further includes steps for determining the data position of the program material corresponding to the specified time T. One step is dining in which segment the specified time occurs; this segment is referred to as the specified segment, and the corresponding atom is referred to as the specified atom. The specified time T is converted to specified-segment relative time $T_{seg}$. In a preferred embodiment, this is done by calculating the elapsed time into the specified segment at which the specified time occurs. $T_{seg}$ is converted to a data position relative to the specified atom, thereby locating media data representing the pram material at the specified time T.

In a preferred embodiment, $T_{seg}$ is converted to specified-atom relative time $T_{atom}$. In a particularly preferred embodiment, this is done by adding the specified-segment's offset to $T_{seg}$. An index number is computed from $T_{atom}$ using an index duration. In a preferred embodiment, the index duration is the duration of a frame of media data.

In a preferred embodiment, the index number is used to identify a data position for the media data representing the program material at the specified time T. In a particularly preferred embodiment, an index file is used to correlate index number with a corresponding data position. In particularly preferred embodiments, the corresponding data positions are the beginning of a frame of media data, or the beginning of a group of pictures of media data.

In a further embodiment of the present invention, a method is provided for synchronizing media data for delivery to a viewer. The synchronization method of the present invention includes identifying a base atom containing media data, and identifying one or more auxiliary atoms containing media data to be synchronized with the media data in the base atom. This synchronization method further includes constructing a base atom index file that contains base atom index boundaries. In a preferred embodiment, the base atom index boundaries are Groups of Pictures boundaries.

This synchronization method also includes constructing an auxiliary atom index file for each of the auxiliary atoms. Each auxiliary atom index file is constructed by selecting the auxiliary atom index boundaries that most closely match the base atom index boundaries, thereby synchronizing media data in the auxiliary atoms with media data in the base atom.

In further embodiments of the present invention, apparatus is provided for implementation of the foregoing indexing and synchronization methods.

In yet further embodiments of the present invention, computer program products for use with a computer system are provided. One such computer program product includes a computer usable medium having computer readable program code for enabling a computer system to carry out the indexing method of the present invention. Another such computer program product includes a computer usable medium having computer readable program code for enabling a computer system to carry out the synchronization method of the present invention.

In yet a further embodiment of the present invention, a system is provided for interactive delivery of program material to a viewer. As used herein, a viewer can be a television viewer, a user of a workstation, or any other entity that receives the program material. This system includes formatting means for arranging media data representing program material in accordance with a viewer command from the viewer, the media data being arranged using the object hierarchy of the present invention. This system also includes computer means in data communication with the formatting means. The computer means is configured to receive the viewer command from the viewer, to transmit the viewer command to the formatting means, and to receive the formatted program material from the formatting means for display to the viewer.

FEATURES AND ADVANTAGES

One feature of the present invention is that it is extensible. Additional atoms can be stored, and new segments, series, and groups created. Additional segments can be added to existing series, and additional series can be added to existing groups.

Another feature of the present invention is that it is flexible. Media data can be arranged in an infinite variety of ways for delivery to a viewer without changing the object hierarchy, or modifying the media data contained in the atoms. Program material data can be partitioned into atoms in numerous ways, only one of which is by media type (e.g., video data in one atom and audio data in another atom).

A further feature of the present invention is that it is adaptable. The object hierarchy can be used with various encoding or data compression protocols. For example, with an MPEG-1 encoding protocol, audio data and video data can be encoded and contained in different atoms. With an MPEG-2 encoding protocol, the audio and video data can be contained in a single atom.

An advantage of the present invention is that many different types of sources of atom data can be used. Data sources may include disk files, shared memory, or even live data sources, such as with audio or video conferencing. A further advantage of the present invention is that it optimizes media delivery from the view point of a viewer and a media provider. A viewer has interactive control over the content of the program material. An optimal mix of program material is transmitted to the viewer, with optimal use of system bandwidth and memory.

The present invention has the further advantage of full interactive control by the viewer over the program material received. The viewer can control not only the content, but the mode in which it is viewed.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

1. Overview

Figure 1:
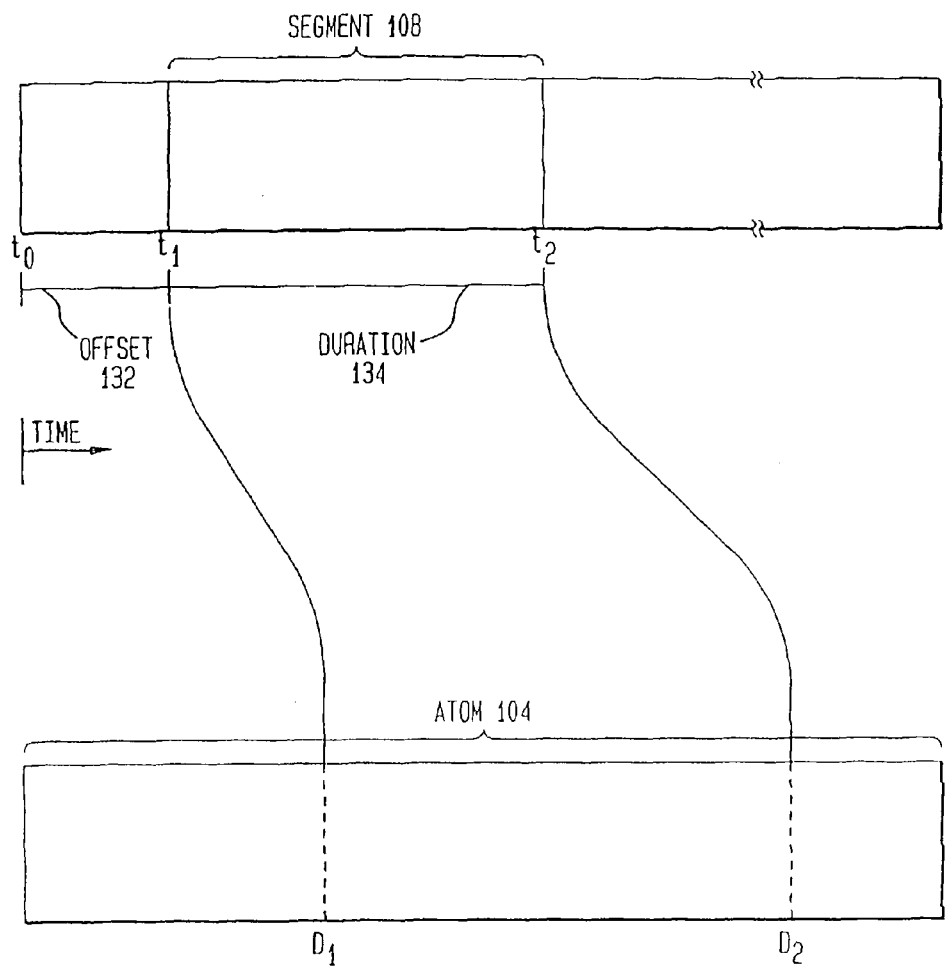
FIG. 1 shows the relationship between a segment and its corresponding atom, with time advancing to the right as shown by the arrow in the figure.

The present invention is directed to a system and method for implementing interactive media delivery to enable a viewer to have interactive control over program material delivered to the viewer. For example, a media provider may transmit program material over a network to a set-top box so that the program material may be played on the viewer's television. Examples of program material include without limitation movies, shows, concerts, how-to and instructional videos, live video and audio, home shopping programs, video games, sporting events, news, and music.

In one scenario, a media provider obtains the program material to be delivered to the viewer from a content provider. For example, a media provider may obtain a movie from a content provider in the form of a tape or reel that contains audio and video tracks for that movie. Alternatively, a content provider may deliver to a media provider a live data feed that contains the audio and video from a live concert or live coverage of a news event.

The program material is usually encoded or transformed into data by the content provider and then provided to the media provider. Alternatively, the media provider could encode the program material provided by the content provider. For example, audio and video tracks of the program material may be encoded by such encoding or data compression protocols as MPEG-1 (ISO/IEC 11172, "Information Technology—Coding of moving Pictures and Associated Audio for Digital Storage Media at up to about 1.5 Mbit/S") or MPEG-2 (ISO/IEC 13818, "Information Technology—Generic Coding of Moving Pictures and Associated Audio"), and provided to the media provider. The term "MPEG" refers to the Moving Picture Experts Group. The encoded data may then be stored in a storage device or other suitable memory means from which it can be accessed immediately, or at a later time. For example, the audio and video tracks of a movie may be encoded and stored in a file on a file server, or, alternatively, stored in a region of a shared memory device. The program material, a movie for example, has now been transformed into data and stored for future access. In accordance with the object hierarchy of the present invention, the program material data is stored as an atom of the present invention. For example, an atom of the present invention may contain video data, audio data, or both video and audio data.

The object hierarchy of the present invention allows program material to be provided to the viewer in an interactive and customized manner without changing or modifying the atom, i.e., without changing or modifying the program material data. The object hierarchy of the present invention allows program material to be transmitted to a viewer in a manner selected by the viewer, and in different ways to different viewers, without changing or modifying the program material itself. The same program material can be arranged or formatted in different ways for delivery to different viewers without having to alter or duplicate the program material. For example, the video for a movie can be packaged with English language audio and transmitted to one viewer. The video for that same movie can be packaged with Spanish language audio and English language closed-captioning text and transmitted to another viewer without having to modify the video data, or duplicate the video data in a separate file.

2. Object Hierarchy

In order to provide flexibility in media delivery, as well as interactive control by a viewer, an object hierarchy was developed that allows accessing and arranging data in an infinite variety of ways. The object hierarchy of the present invention provides for sequentially ordering data (concatenating in an ordered sequence) for transmission serially in time, and grouping data in a parallel manner for transmission simultaneously. The parallel data may be transmitted in a synchronized or an a synchronized manner.

As described generally above, the data representing the program material is contained in an atom. The data representing any particular item of program material can be divided or partitioned into several different atoms. As one example, a movie can be partitioned into two atoms, one atom for video, and another atom for audio. As a further example, the movie can additionally include a third atom containing closed-captioning text. In still a further example, both audio and video data for a movie can be contained in a single atom. As these examples illustrate, for any particular item of program material, there are numerous ways in which the data can be partitioned into atoms. Such partitioning may include, but is not limited to, partitioning by media, e.g., video in one atom and audio in another atom.

An atom may be stored in any suitable manner on a storage device or other suitable memory means. This may include, for example, a file on a disk in a server, an area of a shared memory region, or a memory such rain memory 608 or a secondary memory 610 (discussed in more detail below in connection with FIG. 6). An atom is assigned a unique atom identifier, or atom ID, when the atom is stored. Each atom includes information describing the atom. For example, information in the atom may include one or more of the following: the atom ID; an atom length (program material data length or temporal length or duration of the program material); a data type (e.g., video, audio, ASCII); a data source (storage location of the program material data itself, e.g., a UNIX file, identification of a memory region, or a live data feed); an index source (a file or region that contains various indices, such as for locating data points and synchronizing data); an index duration (time between indexed points); and an encoding protocol (if any) used to transform the program material into data for storage. An atom may also further include a set of allowable playback modes that indicate the suitability of the atom data for reverse or fast-forward play.

An atom is thus the basic building block of the object hierarchy of the present invention. An atom describes the program material data, and identifies the storage location of the actual program material data. In that sense, an atom will be referred to in this document as "containing" the actual program material data. Program material data contained in an atom is accessed, and arranged or formatted for delivery to a viewer through the object hierarchy of the present invention.

A segment identifies a portion of one particular atom, i.e., program material data or "atom data" between two points in time. A segment may identify the entire atom, i.e., atom data between the beginning and ending times of the program material. Alternatively, a segment may identify only a portion of the atom, for example, atom data between the beginning of the program material and another arbitrary time in the program material, atom data between an arbitrary time in the program material and the end of the program material, or atom data between two arbitrary times in the program material.

Each segment is assigned a unique segment identifier or segment ID when it is stored. In a preferred embodiment of the present invention, each segment is defined by an atom ID, an offset (time between the beginning of the atom and the beginning of the segment), and a duration (time between the beginning of the segment and the end of the segment). A segment that corresponds to an entire atom would have an offset of zero, and a duration equal to the duration of the atom.

FIG. 1 illustrates the relationship between an atom and a segment. Referring now to FIG. 1, an atom 104 is shown that contains data for program material. Segment 108 identifies a portion of atom 104. Segment 108 extends from time $t_1$ to time $t_2$, and identifies the data in atom 104 between corresponding data locations $D_1$ and $D_2$. Segment 108 is defined using the parameters of offset 132 and duration 134. Offset 132 is defined as the time between the beginning of the atom ($t_0$) and the beginning of segment 108 ($t_1$). Duration 134 is defined as the time between $t_1$ and $t_2$, or the temporal length of segment 108. In the embodiment illustrated in FIG. 1, offset 132 and duration 134 are specified in units of time, as shown by the arrow at the bottom of the figure indicating time progressing to the right. Alternatively, offset 132 and duration 134 may be specified in units of data length, such as bytes.

Segment 108 may begin contemporaneously with the beginning of atom 104 at time $t_0$. In that situation, offset 132 is equal to zero. With offset 132 equal to zero, duration 134 of segment 108 may be equal to the duration of atom 104. In the latter situation, segment 108 represents the entirety of atom 104 (see also FIG. 3).

A series is formed by sequentially ordering one or more segments. A series is a set of one or more segments that are joined or concatenated for sequential delivery of the corresponding data. A series can be described in one embodiment as an ordered list of segments. A series is assigned a unique series identifier or series ID when it is stored. In an alternative embodiment, a series can be described as an ordered list of segment IDs. The length of a series is the sum of the length of its component segments.

A group is formed by joining or grouping series in parallel for parallel, simultaneous delivery of the corresponding data. Preferably, the delivery of the series in a group is synchronized. This is useful where one series is a set of segments identifying a video atom, and the other series is a set of segments identifying the corresponding audio atom. Such synchronized delivery enables the video to be synchronized with the audio. A group is assigned a unique group identifier or group ID when it is stored. In one embodiment, a group can be described as a parallel arrangement of series IDS.

In the object hierarchy of the present invention, a series may alternatively be defined as an empty set of zero segments. Similarly, a group may alternatively be defined as an empty set of zero series. However, such groups and series will not be useful for identifying and formatting program material data. As such, the invention will be described herein with respect to a group having at least one (one or more) series, and a series having at least one (one or more) segment.

Figure 2:
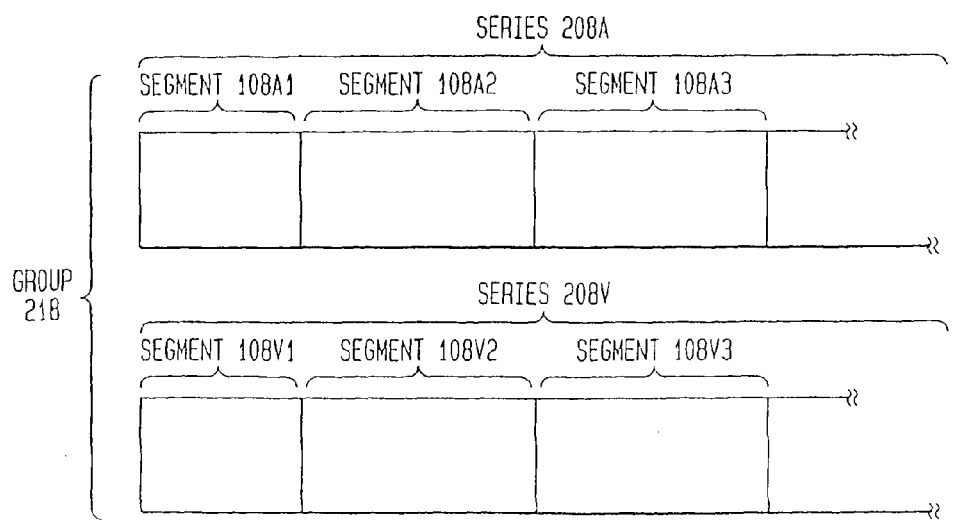
FIG. 2 shows the relationship between a group, two series within the group, and multiple segments within each of the two series.

FIG. 2 is a diagram illustrating two series 208 (208A and 208V) and a group 218. Referring now to FIG. 2, each series comprises a sequence of segments 108. In the example illustrated in FIG. 2, series 208A is comprised of segments 108A1, 108A2, 108A3, etc. Series 208A lists or joins segments 108A1, 108A2, 108A3, etc. in the correct sequential order. Similarly, series 208V lists or joins segments 108V1, 108V2, 108V3, etc. in the correct sequential order. The example illustrated in FIG. 2 further shows that group 218 is comprised of two series: series 208A; and series 208V.

In an example where the program material is a movie, series 208A may be a series of segments 108 corresponding to audio data in one or more audio data atoms 104 (not shown). Likewise, series 208V may be a series of segments 108 corresponding to video data in one or more video data atoms 104 (not shown). In such an example, group 218 is the parallel occurrence (delivery, playback, etc.) of the audio and video portions (series 208A and 208V, respectively) of the movie. As can be seen from FIG. 4, segments in a series can point to the same or different atoms.

A media delivery system using the object hierarchy of the present invention delivers program material to a viewer as defined by a group. A group serves as the "formula" for arranging the program material to be delivered to a viewer. A media delivery system using the object hierarchy of the present invention has a high degree of flexibility. A few examples of this flexibility include, without limitation, the ability to provide delivery options such as language choices for audio and closed-captioning text, and the ability to provide customized program material with special effects and alternative media insertion.

Three examples will now be describe to illustrate the flexibility provided by the object hierarchy of the present invention. The first example illustrates the delivery of program material to a viewer without modification. The second example illustrates inserting or interleaving one type of program material (such as a commercial) into another type of program material (such as a movie). The third example illustrates how a plurality of different types of program material can be arranged to provide custom program material formatting and special effects.

Figure 3:
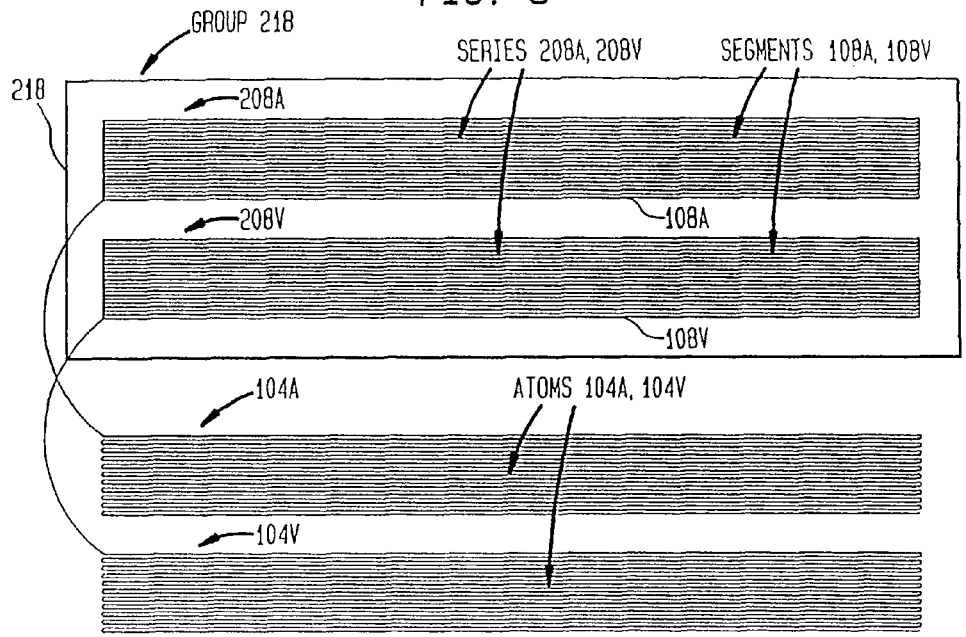
FIG. 3 shows one embodiment of a group that includes two series, each series containing one segment, and each segment referencing the entirety of its corresponding atom.

FIG. 3 is a diagram illustrating the first example where program material is delivered to a viewer without modification. In this example, the viewer is delivered a group 218 that includes two series 208A and 208V. Series 208A and 208V each contain a single segment 108A and 108V, respectively. Segment 108A corresponds to the entirety of atom 104A, and segment 108V corresponds to the entirety of atom 104V. Offset 132 of each segment 108A and 108V is zero, and duration 134 is equal to the duration of atom 104A and 104V, respectively.

In the example shown in FIG. 3, atom 104A may contain audio data for a movie, and atom 104V may contain the corresponding video data for the movie. A viewer watching this movie would see video and hear audio together. Alternatively, atom 104A may contain audio and video data for an instructional how-to program, and atom 104V may contain instructional text for the how-to program. A viewer watching such a how-to program would see video and instructional text, as well as hear audio together with the video and text.

Figure 4:
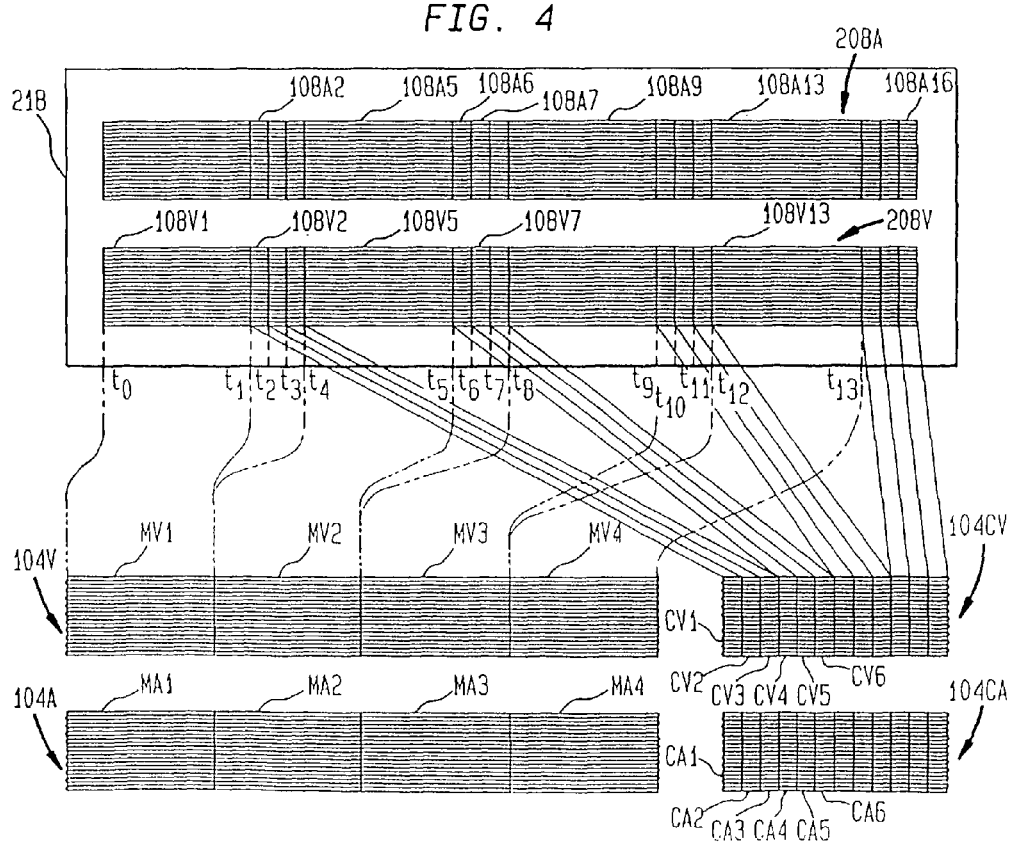
FIG. 4 shows a further embodiment of a group that includes two series, each series containing multiple segments, illustrating interleaving of varied program materials from a plurality of atoms to form a composite.

FIG. 4 is a diagram illustrating the second example referred to above where varied program materials are interleaved to form a composite program material that is delivered to a viewer. As in the previous example illustrated in FIG. 3, a viewer is delivered a group 218 that includes two series 208A and 208V. However, in the example shown in FIG. 4, each series 208A and 208V is made up of a plurality of segments 108. As illustrated in FIG. 4, series 208A includes 16 segments (108A1 through 108A16) and series 208V also includes 16 segments (108V1 through 108V16). Only selected segments have been labeled for clarity. It is to be understood that 16 segments in each series have been shown for illustrative purposes only, and that the number of segments in each series can vary, and is not limited to 16.

Segments 108 shown in FIG. 4 correspond to portions of four different atoms 104A, 104V, 104CA, and 104CV. Particularly, segments 108 of series 208A correspond to portions of atoms 104A and 104CA, while segments 108 of series 208V correspond to portions of atoms 104V and 104CV. The correspondence between series 208A and the atoms has been omitted for clarity, but would be analogous to that shown for series 208V.

The embodiment illustrated in FIG. 4 will be described in terms of an exemplary embodiment where the program material ordered by a viewer is a movie, and the media provider wishes to include commercials inserted at intervals during the movie. In such an exemplary embodiment, the movie is partitioned into atom 104A for audio, and atom 104V for video. In the exemplary embodiment, a second type of program material to be interleaved within the movie is a set of three commercials. In this example, the commercials are all partitioned into two atoms, 104CA that contains the audio for all of the commercials, and 104CV that contains the video for all of the commercials. Alternatively, each of the three commercials could be partitioned into its own pair of atoms (e.g., one for audio and one for video). In a further alternative, each of the three commercials could be contained in a single atom (audio and video combined in one atom for each commercial). Although the foregoing and other alternatives may be preferred, the following discussion refers to the partitioning shown in FIG. 4.

To insert the set of three commercials into the movie, segments corresponding to commercial atoms 104CV and 104CA are interleaved between segments corresponding to movie atoms 104V and 104A, respectively, as illustrated in FIG. 4. Particularly, segments 108V2, 108V3, and 108V4, corresponding to the video portion CV1, CV2, and CV3 of the first set of three comments in atom 104CV, are inserted between segments 108V1 and 108V5, corresponding to the video portion MV1 and MV2 of the first two parts of the movie in atom 104V. Similarly, segments 108V6, 108V7, and 108V8, corresponding to the video portion CV4, CV5, and CV6 of the next set of three commercials in atom 104CV, are inserted between segments 108V5 and 108V9, corresponding to the video portion MV2 and MV3 of the next two parts of the movie in atom 104V.

A viewer watching the program material delivered in accordance with group 218 as illustrated in FIG. 4 sequentially sees a portion of the movie (video portion MV1 together with audio portion MA1), followed by a set of three commercials (video portions CV1, CV2, and CV3 together with audio portions CA1, CA2, and CA3), followed by the second portion of the movie (video portion MV2 together with audio portion MA2), followed by a second set of three commercials (video portions CV4, CV5, and CV6 together with audio portions CA4, CA5, and CA6), and so on until the end of the program material identified by group 218.

In the exemplary embodiment of FIG. 4, segments 108A1-108A16 have the same offset 132 and duration 134 as their counterpart segments 108V1-108V16. As illustrated in FIG. 4, segments 108A1 and 108V1 have an offset 132 of zero and a duration 134 of $t_1-t_0$. In the preferred embodiment of the present invention, program material begins at time $t_0=0$. Thus, duration 134 of $t_1-t_0=t_1$. Similarly, segments 108A2 and 108V2 have an offset from the beginning of series 208A and 208V, respectively, of $t_1$. Segments 108A2 and 108V2 have an offset 132 of zero because each segment corresponds to the beginning of atom 104CA and 104CV, respectively. Segments 108A2 and 108V2 have a duration 134 of $t_2-t_1$.

As a further illustration, segments 108A5 and 108V5 have an offset 132 of $t_1$ measured from the beginning of corresponding atoms 104A and 104V, respectively. As shown in FIG. 4, portion MV2 of atom 104V that corresponds to segment 108V5, and portion MA2 of atom 104A that corresponds to segment 108A5, begin at time $t_1$. Segments 108A5 and 108V5 have a duration 134 of $t_5-t_4$. Similarly, segments 108A13 and 108V13 have an offset 132 of $t_1+(t_5-t_4)+(t_6-t_5)$ that corresponds to the beginning of MA4 and MV4, respectively. Duration 134 of segments 108A13 and 108V13 is $t_{13}-t_{12}$. As yet a further illustration, segments 108A7 and 108V7 have an offset 132 of $(t_4-t_1)+(t_6-t_5)$ that corresponds to the beginning of CA5 and CV5, respectively. Duration 134 of segments 108A7 and 108V7 is $t_7-t_6$. A similar analysis is used to determine offset 132 and duration 134 for the remaining segments in group 218.

Other examples of the embodiment illustrated in FIG. 4 are also contemplated. One such example is for an instructional program. In such an example, atoms 104V and 104A are the video and audio, respectively, of the instructional portion of the program material, while atoms 104CV and 104CA are the video and audio, respectively, for questions pertaining to the instructional portion of the program material.

In yet another example of the embodiment illustrated in FIG. 4, the program material is again a movie. However, instead of interleaving commercials during the movie, movie previews of other movies are inserted. In such an example, segments 108 corresponding to atoms 104CV and 104CA are the video and audio portions, respectively, of the movie previews to be inserted during presentation of the movie contained in atoms 104V and 104A. Alternatively, the movie-preview program material could be inserted at either the beginning or the end of the movie, as well as in the middle, to entice the viewer to order further movies.

Figure 5:
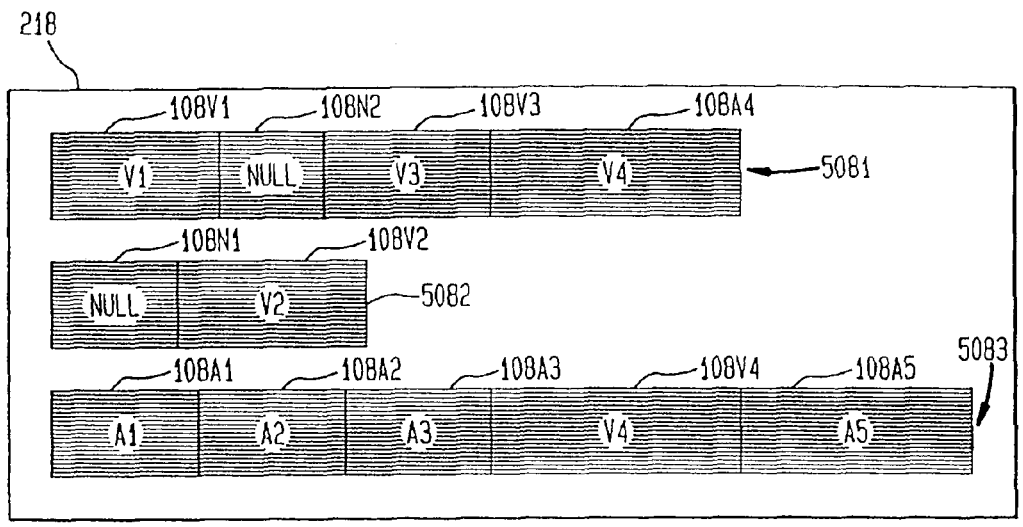
FIG. 5 shows an embodiment of a group that interleaves three series, each series containing a plurality of segments, illustrating the special effect capability of the object hierarchy of the present invention.

FIG. 5 illustrates a third example wherein a plurality of different series 208 are arranged to provide custom program material formatting, and to use the object hierarchy to produce special effects as explained below. According to the illustrated embodiment, group 218 includes three series 5081, 5082, and 5083. Series 5081 includes two video segments 108V1 and 108V3, a null segment 108N2, and an audio segment 108A4. Series 5082 has a null segment 108N1, and a video segment 108V2. Series 5083 has four audio segments 108A1, 108A2, 108A3, and 108A5, and one video segment 108V4. The atoms corresponding to each of the foregoing segments have been omitted for clarity.

In delivering group 218 illustrated in FIG. 5 to a viewer, series 5081, 5082, and 5083 may be transmitted in a parallel, synchronized manner. In such a transmission, video segment 108V1 is delivered contemporaneously with audio segment 108A1. During this time interval, null segment 108N1 functions as a space or time marker for series S082, during which time no data is transmitted to the viewer from series 5082. Prior to the end of delivery of video segment 108V1, delivery of video segment 108V2 from series 5082 begins. The phase-out of video segment 108V1 and phase in of video segment 108V2 can be accomplished using any of a number of techniques known in the art, such as a "wipe", a "dissolve", or other type of "special effect". During the phaseover from video segment 108V1 to video segment 108V2, the audio portion of the program material changes from audio segment 108A1 to audio segment 108A2. Null segment 108N2 is used to mark time in series 5081 between video segments 108V1 and 108V3. After null segment 108N2 is completed, the video portion of the program material begins to phaseover from video segment 108V2 to video segment 108V3. During the phaseover period, the audio portion changes from audio segment 108A2 to audio segment 108A3 in series 5083. Audio segment 108A4 is delivered with video segment 108V4. The program material ends with audio segment 108A5 delivered without accompanying video.

The embodiment shown in FIG. 5 is particularly illustrative of how various segments can be arranged in series, and the series in groups, thereby providing tremendous flexibility in the delivery of media to a viewer. For example, null segments can be used to skew or offset the delivery of data from one atom with respect to data from another atom.

Note that the foregoing examples have been described in terms of audio and video portions of the program material being stored in separate atoms 104. However, the object hierarchy of the present invention is not limited to such partitioning by media. For example, an atom 104 can contain both the audio and the video for an item of program material. Alternatively, an atom can contain graphics for a game, with a second atom containing sound effects for that game, and a third atom containing an instructional text overlay for the game graphics. In this manner, a viewer or game player could select whether they wanted to receive delivery of the sound effects or the instructional text, i.e., the sound effects and the instructional text could be turned on and off under the control of the game player. In yet a further alternative, the graphics, sound effects, and instructional text can all be contained in a single atom.

In yet another alternative embodiment, consider program material that is available in multiple languages. In this embodiment, a viewer can select a language from a menu of language choices. In that way, only the data from atom 104 containing the program material in the selected language are delivered to the viewer, with or without accompanying video. In such a scenario, the audio and video may be in separate atoms so that many audio atoms in different languages could accompany the same video atom. This has the benefit of saving on storage space. When video and audio are combined in one atom, each language would require an implicit copy of the video. However, when audio and video are stored separately, one copy of the video can serve all of the audio languages. Additionally, new audio atoms can be added without affecting the video atom, or needing to duplicate the video atom.

In yet another example, the object hierarchy of the present invention could be used in an audio or video conferencing environment, or other environments where the source for the atom data is a live data feed.

The object hierarchy of the present invention may also be used to synchronize delivery of program material to two or more different viewers. Each series in a group could be delivered simultaneously to two or more viewers, thereby having delivery to one viewer remain synchronized with delivery to other viewers. For example, a lecture being given in one location can be delivered simultaneously to all audience members, e.g., students. Each audience member could be in a different location, and in a location remote from the lecturer.

The object hierarchy of the present invention affords the media provider great flexibility to offer a viewer a broad range of program material products. As illustrated above with several examples, a media provider can deliver program materials in a format that suits the needs of the media provider, as well as the desires of an individual viewer. The object hierarchy of the present invention also allows alternative forms of the same program material to be provided to various viewers without having to store multiple and/or different versions of the same program material. The media provider can use atoms of program material to arrange custom program content that is different for each delivery. To customize program material for a viewer, it is not necessary to change or modify data in the atoms of that program material. Rather, all that has to be changed is the composition of the group delivered to the viewer.

The above examples are provided to help describe the media object hierarchy provided according to the invention, as well as to illustrate a few of the numerous possibilities available to a media provider for storing, arranging, and transmitting program material, and to a viewer for viewing program material. The examples and embodiments described above are provided by way of example only and should not be construed as limitations.

Figure 6:
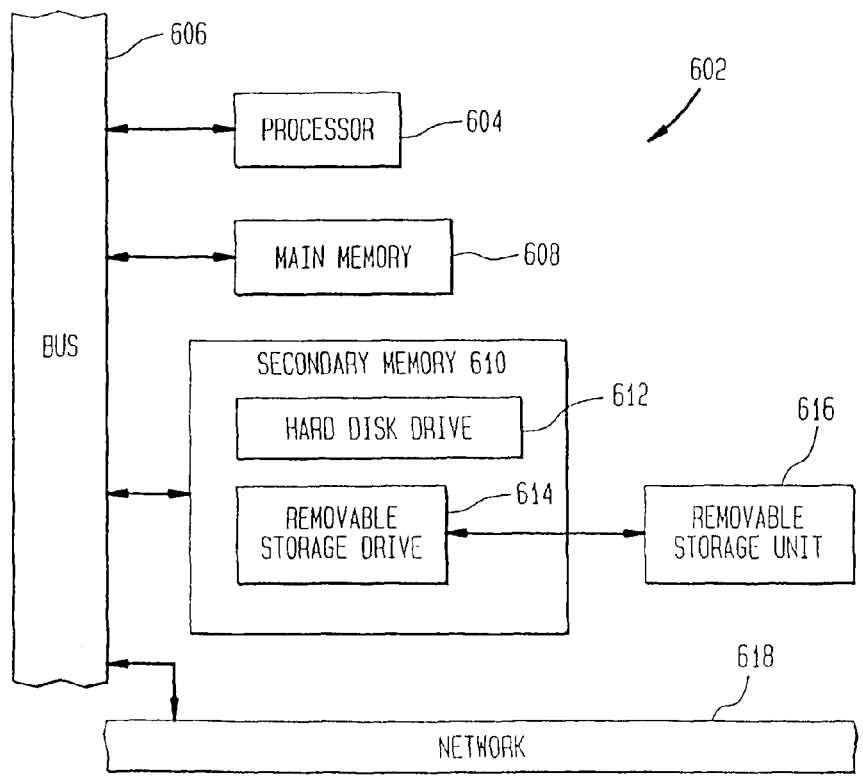
FIG. 6 shows a computer system suitable for storing and arranging media data for delivery to a viewer using the object hierarchy of the present invention and suitable for implementing the indexing and synchronization methods of the present invention.

In a further embodiment, the present invention is directed to a computer system for storing and arranging media data for delivery to a viewer using the object hierarchy as described herein. An exemplary computer system 602 is shown in FIG. 6. Computer system 602 includes one or more processors, such as processor 604. Processor 604 is connected to a communication bus 606.

Computer system 602 also includes a main memory 608, preferably random access memory (RAM), and a secondary memory 610. Secondary memory 610 includes, for example, a hard disk drive 612 and/or a removable storage drive 614, representing a floppy disk drive, a magnetic tape drive, a compact disk drive, etc. Removable storage drive 614 reads from and/or writes to a removable storage unit 616 in a well known manner. Main memory 608 may be used to store atoms (including the program material contained therein), as well as other data such as index sources or data locations, in accordance with the object hierarchy of the present invention. Alternatively, secondary memory 610 may be used to store atom data and index sources.

Removable storage unit 616, also called a program storage device or a computer program, product, represents a floppy disk, magnetic tape, compact disk, etc. As will be appreciated, removable storage unit 616 includes a computer usable storage medium having stored therein computer software and/or data.

Computer system 602 is connected to a network 618 so that program material may be retrieved and delivered to a viewer. Computer system 602 may communicate via network 618 with other computer systems or servers. Computer system 602 may also communicate via network 618 with a media delivery system for delivery of program material to a television viewer, to a workstation, or to other recipients.

Computer programs (also called computer control logic) are stored in main memory 608 and/or secondary memory 610. Such computer programs, when executed, enable computer system 602 to implement the object hierarchy of the present invention. In particular, the computer programs, when executed, enable processor 604 to store and arrange media data for delivery to a viewer using the object hierarchy of the present invention. Accordingly, such computer programs represent controllers of computer system 602.

In another embodiment, the invention is directed to a computer program product comprising a computer readable medium having control logic (computer software) stored therein. The control logic, when executed by processor 604, causes computer system 602 to store, arrange, format, and deliver media data to a viewer using the object hierarchy of the invention as described herein.

In another embodiment, the invention is implemented primarily in hardware using, for example, a hardware state machine. Implementation of the hardware state machine to store and arrange data using the object hierarchy of the present invention will be apparent to persons skilled in the relevant arts.

3. Media Stream Indexing

Conventional media delivery systems, such as conventional video-on-demand systems, do not provide a way for a viewer to skip or jump to selected points in the program material. Conventional media delivery systems also do not allow the viewer to view the program material in special modes such as slow motion, still, pause, single-frame advance, fast-forward, reverse, etc. Instead, with conventional systems, a viewer is forced to watch or view the program material in conventional playback mode as it is being transmitted by the media provider. The present invention provides a system and method for allowing a viewer to control delivery of the program material to jump or skip (either forward or backward) to selected points in the program material. Additionally, the present invention allows a viewer to view the program material in any of the above-defined special modes, as well as in a conventional playback mode.

In order to provide a viewer with interactive control for viewing program material in special modes, an indexing method was developed to correlate between time and program material data or atom data location. The indices used with the method of the present invention would typically be generated by a media provider. For example, to allow a viewer to skip to a certain time in the program material, the viewer specifies the particular time to which the viewer would like to skip. In response, program material is delivered to the viewer by the media provider beginning from the corresponding data position.

To view program material in special modes such as slow-motion, still, pause, etc., it is necessary to locate a particular time in the program material, and to deliver program material data corresponding to that particular point in time. As discussed more fully below, in an environment in which program material is temporally divided into frames, it is necessary to locate the frame that corresponds to the particular time, and to deliver one or more frames of program material data beginning with the corresponding frame.

Figure 7:
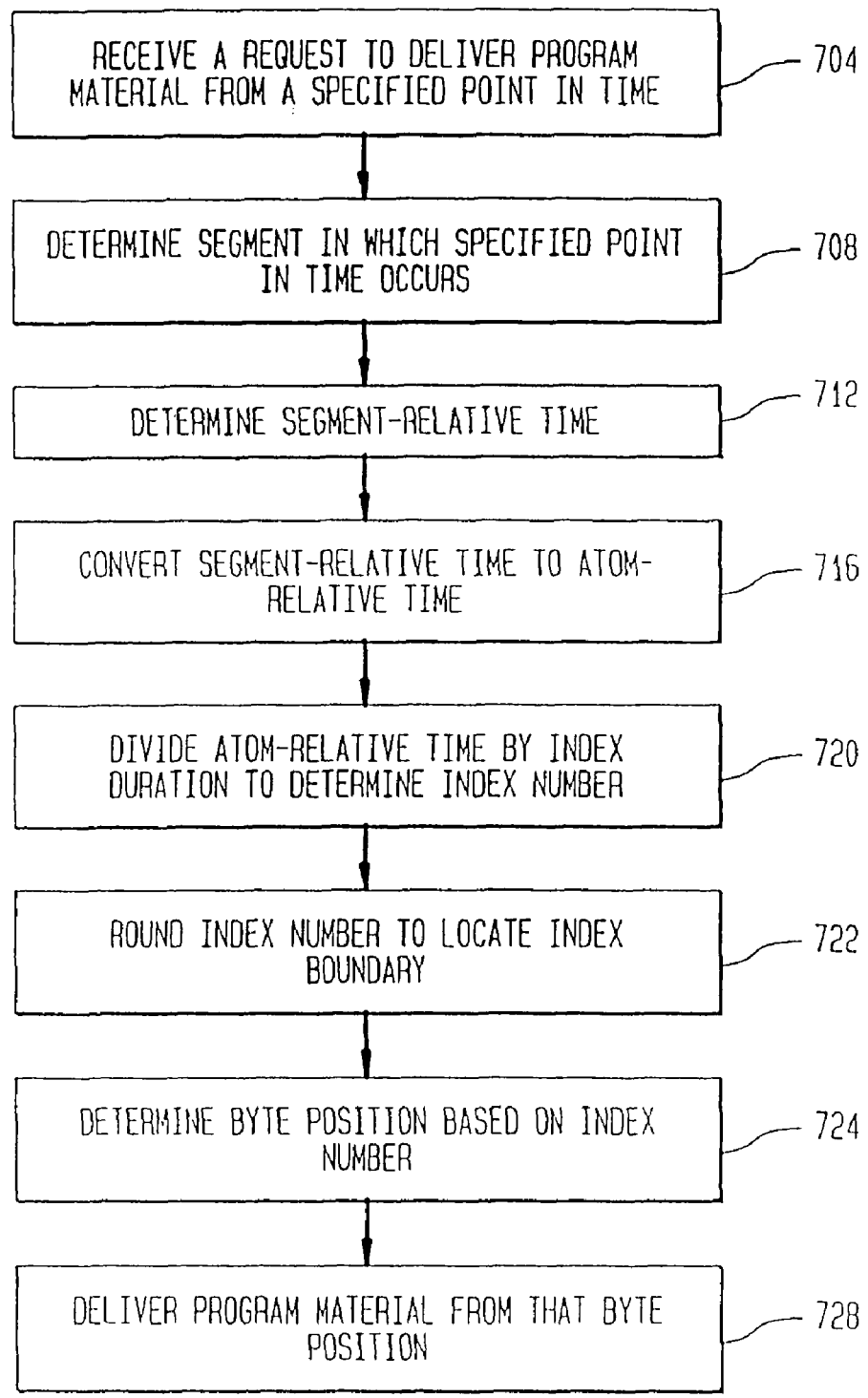
FIG. 7 shows a flow diagram illustrating a process for determining the location of media data corresponding to a specified point in time in an item of program material.

FIG. 7 is a flow diagram illustrating a process for determining the location of media data corresponding to a particular or specified point in time in the program material. In this document, the specified point in time is referred to as an epoch. Referring now to FIG. 7, in a step 704, a request is received to deliver the program material from a specified point in time (the epoch). For example, a viewer may request that the program material skip to a specific time, or a viewer may request that delivery advance to a certain milestone in the program material, such as the beginning of the next act of a play.

In a step 708, it is first determined in which segment the epoch occurs. For programs having a series that contains only one segment, the epoch occurs in that segment. For programs having a series that contains more than one segment, the first step in the process is determining in which segment the epoch occurs.

In a step 712, a segment-relative time $T_{seg}$ of the epoch is determined. Segment-relative time $T_{seg}$ is the amount of time into the segment at which the epoch occurs.

In a step 716, segment-relative time $T_{seg}$ is converted into an atom-relative time $T_{atom}$. Atom-relative time $T_{atom}$ is the amount of time into the corresponding atom at which the epoch occurs.

In a step 720, atom-relative time $T_{atom}$ is converted to an index number IN by dividing $T_{atom}$ by an index duration ID. Index duration ID is preferably a constant, and is one of the attributes or information items stored in an atom. An index rate IR is the mathematical reciprocal or inverse of index duration ID so that IR=1/ID and ID=1/IR. Because of this reciprocal relationship, either the index rate or the index duration can be used to compute index number. Index number IN corresponds or maps to a byte-relative position of the epoch in the corresponding atom.

If an epoch selected by a viewer is in the middle of a frame or other parsed data unit, it is necessary to "round down" to the beginning of that frame, or "round up" to the next flame. This is achieved by rounding index number IN in a step 722 to locate a frame boundary, or other index boundary. When the epoch is in the middle of a frame that occurs near or at the end of a segment, rounding up to the next frame may result in the epoch occurring in the next segment Similarly, rounding down may result in the epoch occurring in the previous segment. Although index number IN is preferably an integer value, a function other than simple arithmetic rounding (e.g., a floor or ceiling function) may be required. For example, as explained more fully below, some byte positions may be repeated in an index source. In that situation, the step of rounding includes scanning the index source for the next different byte position that corresponds to the beginning of the next Group of Pictures.

In a step 724, index number IN is used to determine byte position. In one embodiment, an index source such as an index file is used to map from index number IN to byte position. In such an embodiment, an index file may contain a sequence of 64-bit byte positions corresponding to the index numbers. The index source contains the byte positions, and index number IN is used to map to the byte position by identifying the offset from the beginning of the index file at which that byte position is located. Index numbers within an atom are unique, and are not repeated.

An example will illustrate this process. Assume that it is necessary to locate the byte position of data occurring one second (1 sec=$10^6$ μsec) into an atom. Assume an index duration of approximately 1/30 sec (33,000 μsec), the preferred index duration of video data. Index number IN may be computed as follows:

$$IN = \frac{10^6 \ \mu\text{sec}}{33{,}000 \ \mu\text{sec}} = 30.$$

Alternatively, index number IN may be computed by multiplying by the index rate which is the reciprocal of the index duration:

$$IN = 10^6 \ \mu\text{sec} \times (3 \times 10^{-5}/\mu\text{sec}) = 30.$$

The byte position of data occurring at 1 second into the atom will be located at index number 30 offset from the beginning of the index file.

In an alternate embodiment, an algorithm may be used in step 724 to convert index number to byte position. Such an algorithm may, for example, depend on actions previously taken, such as in an interactive-plot movie. The present invention is not limited to the use of predetermined or precomputed indices. The present invention comprehends the use of indices that are determined or computed "on the fly" as they are needed.

Finally, in a step 728, program material data beginning at the byte-relative position determined in step 724 is delivered to the viewer.

Process steps 708 through 728 of FIG. 7 are preferably carried out for each series in a group. An implicit first step not shown in FIG. 7 is the conversion from movie-relative time to series-relative time $T_{series}$. In a preferred embodiment of the present invention, movie-relative time is the same as series-relative time $T_{series}$, with all series and movies (or other program material) beginning at time zero. Although this embodiment is preferred, the present invention is not so limited, and there may be a time offset between program material-relative time and series-relative time $T_{series}$.

Figure 8:
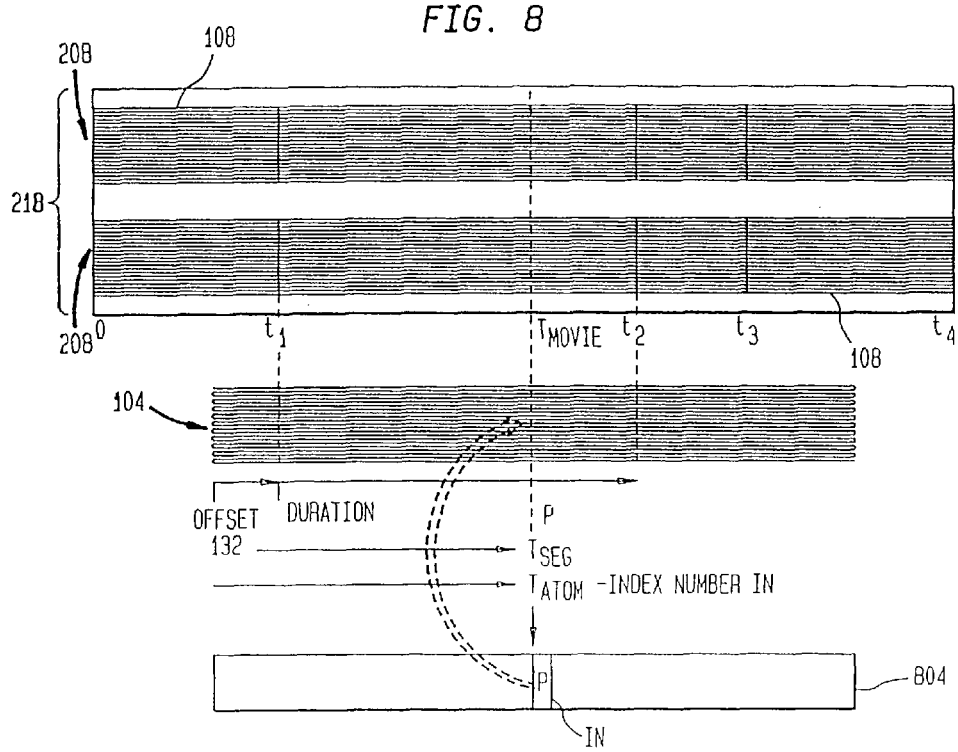
FIG. 8 shows an example of determining, in accordance with the process of FIG. 7, a byte position in an atom corresponding to a time $T_{movie}$ in a movie.

To further illustrate the process of FIG. 7, an example is provided in FIG. 8. In the example of FIG. 8, a viewer is watching a movie that comprises a group 218. Group 218 includes two series 208. Each series 208 includes four segments 108. In accordance with the object hierarchy described above, each segment 108 corresponds to a part or all of an atom 104, and is defined by an offset 132 and a duration 134 with respect to that corresponding atom. In this example, the viewer desires to skip to a particular time in the movie, labeled as $T_{movie}$ in FIG. 8.

The process of converting from "movie-relative time" ($T_{movie}$ in FIG. 8) to "atom-relative byte position" will now be described with reference to the process of FIG. 7. It is to be understood that the process is carried out for each of series 208 of group 218 shown in FIG. 8. In accordance with step 708, it is determined that $T_{movie}$ occurs in the second segment of each series, the duration of this segment being $t_2-t_1$. As described by step 712, $T_{movie}$ is converted to segment relative time $T_{seg}$, where $T_{seg}$ represents the elapsed time into the segment at which $T_{movie}$ occurs ($T_{movie}-t_1$).

In accordance with step 716, $T_{seg}$ is then converted to atom-relative time $T_{atom}$. Atom 104 corresponding to the second segment is shown in FIG. 8. Offset 132 of the second segment is added to $T_{seg}$ to obtain atom-relative time $T_{atom}$.

The next step in the conversion process is determining the index number in order to map $T_{atom}$ to an atom-relative byte position. In accordance with step 720, index number IN is calculated by dividing $T_{atom}$ by an index duration ID. In the example of FIG. 8, group 218 represents a movie. For the purpose of this example, one of the series in group 218 may correspond to video data and the other may correspond to audio data. A preferred index duration ID for video data is the duration of a frame, typically approximately 1/30 sec. To convert to an index number, $T_{atom}$ is divided by an index duration equal to approximately 1/30 see. It should be noted that in the preferred embodiment of the present invention, all times are calculated in units of microseconds.

If $T_{movie}$ corresponds to a time that occurs in the middle of a frame, then index number IN is rounded to locate an index boundary corresponding to a frame boundary, in accordance with step 722. After rounding, index number IN is used to determine byte position P in accordance with step 724. For example, an index source or index file 804, such as in the form of a lookup table, may be used to map or correlate index number IN to byte position P within the stored movie data. Movie data will then be delivered to the viewer beginning at byte position P, in accordance with step 728.

As noted above, group 218 in FIG. 8 includes two series. The process of FIG. 7 as described above is preferably performed for each series. Generally, the index rate (or duration) used for a segment in one series in a group will not be the same as the index rate (or duration) used for a corresponding segment in another series in that group. For example, one of series 208 illustrated in FIG. 8 may correspond to video data, and the other series in grow 218 may correspond to audio data. As noted above, a preferred index duration for video data is the frame duration, typically approximately 1/30 sec. A preferred frame duration for audio data is 24 msec (approximately 1/42 sec corresponding to a frame rate of 42/sec). However, a preferred index duration for audio data is to have the same value as the preferred index duration for video data. By selecting the same index duration for audio and video data, better synchronization between audio and video data can be achieved. However, the present invention is not limited to the use of the same index rates or index durations for audio and video data.

The indexing method of the present invention allows a viewer to skip to an arbitrary point in time in an item of program material. Without an index file to convert from program material-relative time to atom-relative byte position, program material data in an atom could only be accessed sequentially from the beginning to the end. It would not be possible to jump or skip to an arbitrary time point in the program material because the location of the program material data corresponding to that arbitrary time point would not be known.

Some program material is divided into frames, or other types of parsed data units. For example, video data is typically parsed by frames, each frame having a fixed duration but varying in size. In an environment in which the program material is not divided into frames, the indexing method of the present invention provides a mapping between atom-relative time $T_{atom}$ and atom-relative byte position P to allow access to an arbitrary byte position.

However, in an environment in which the program material data is divided or parsed into frames through encoding or otherwise, it is preferable that the point to which a viewer skips or jumps is not completely arbitrary. Specifically, it is preferred that the point to which the viewer skips is the beginning of a frame. For example, program material may be transmitted to a set-top computer where it is decoded for viewing on the viewer's television set. The decoder in the set-top box recognizes a "frame" of video data as a defined bit stream having a start code and an end code. If data transmitted to the set-top box begins in the middle of the frame, i.e., in the middle of the defined bit stream, it will not be recognized by the decoder, and will not be displayed to the viewer.

Where MPEG encoding is used, frames vary in size or amount of data (e.g., the number of bytes), but are always presented for the same duration, typically approximately 1/30 sec. The data compression of MPEG encoding preserves the natural frame rate for video data of 30 frames per second. Although frames of data are delivered at a constant rate, the size or amount of data in each frame varies, so it is necessary to determine the byte location of the beginning of any particular frame. The indexing method of the present invention allows program material to be delivered from the beginning of a frame, rather than from an arbitrary byte position within a frame.

To ensure that, when converting from movie-relative time (time relative to the program material) to atom-relative byte position, the byte position corresponds to the beginning of a frame, an index file is constructed for the atom containing the frame-partitioned data. This index file includes byte offsets so that the atom-relative byte position in the index file corresponds to "safe" frame, or other type of index, boundaries. The index file is constructed by processing the encoded data with a tool that parses the encoded data in a manner suitable for the particular encoding scheme. An encoding-scheme-specific tool identifies index boundaries suitable for that encoding scheme. In a preferred embodiment, one tool is used to construct index files for MPEG-1 encoded video data, another tool is used to construct index files for MPEG-1 encoded audio data, and yet another tool is used to construct index files for MPEG-2 encoded audio and video data.

An index source, of which an index file is one example, corresponds to the atom from whose data it was generated. An index source is preferably generated one time, when the corresponding atom is encoded and/or installed on a media provider's delivery system. An index source is preferably not generated each time the atom is used or delivered in order to preclude having to parse encoded data repeatedly and "on the fly." However, if the program material is "interactive" so that the program material delivered depends upon actions previously taken, such as in an interactive-plot movie, then the index source is generated "on the fly" as the atom is being used.

The program material can be delivered in the mode specified by a viewer by delivering the frames corresponding to the viewer's request. For example, for fast forward playback, frames can be delivered at a faster rate, or periodic frames (i.e., every other or every third frame, etc.) can be skipped. For reverse playback, the frames can be delivered in reverse order. For jumping to a specified point in the program material, delivery begins at the frame corresponding to that point.

Figure 9:
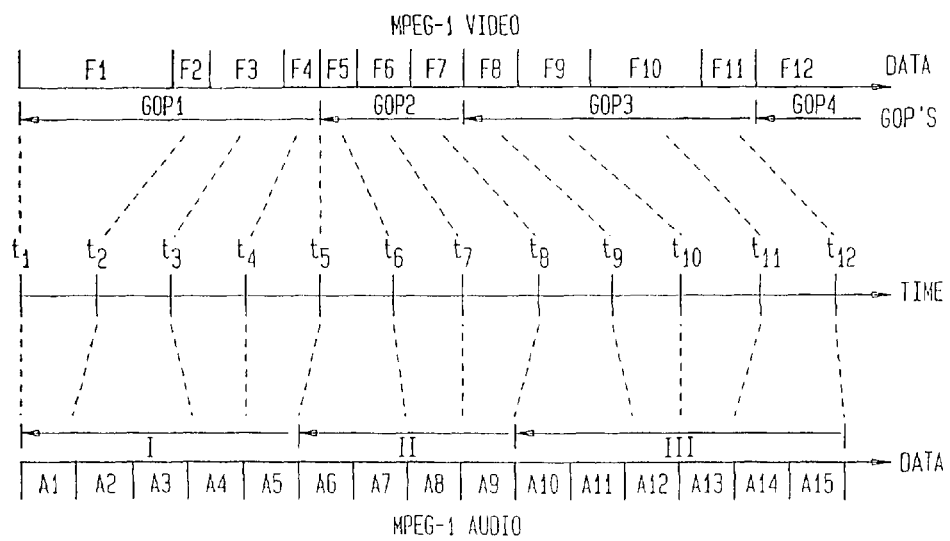
FIG. 9 shows the relationship between frames and groups of pictures in MPEG-1 encoded video data, and shows an example of the indexing and synchronization methods of the present invention using MPEG-1 encoded video and MPEG-1 encoded audio data.

In some encoding protocols, such as MPEG-1, video data frames are grouped together into units referred to herein as "Groups of Pictures" (GOPs). A GOP is comprised of one or more frames. In an environment using GOP, an index file is preferably constructed that allows a viewer to skip only to the beginning of a GOP, not simply to the beginning of a frame within the GOP. FIG. 9 illustrates the relationship between frames and a GOP. FIG. 9 shows MPEG-1 video data divided into twelve frames, shown as F1, F2, . . . F12. The twelve frames are further grouped into four GOPs, shown as GOP1, GOP2, GOP3, and GOP4. Particularly, frames F1, F2, F3, and F4 are in GOP1, frames F5, F6, and F7 are in GOF2, frames F8, F9, F10, and F11 are in GOP3, and frame F12 is in GOP4. The time axis shown in FIG. 9 is marked at regular intervals, i.e., the frame duration or time for which a particular flame is presented, generally approximately 1/30 sec. Dashed lines correlate the beginning of each frame with the corresponding time. Frame F1 begins at time $t_1$, frame F2 begins at time $t_2$, frame F3 begins at time $t_3$, etc. The MPEG-1 video data of FIG. 9 has a fixed index duration, the index duration being the duration of each frame, or 1/30 sec. FIG. 9 illustrates that although frames F1-F12 all have the same duration, the frames have varying sizes. For example, frame F1 is larger than frame F2, i.e., frame F1 contains more data than flame 12.

MPEG-1 audio has only one grouping level so that "audio frames" are not further grouped into "audio GOPS". The MPEG-1 audio data of FIG. 9 is broken down into fifteen audio frames A1, A23, . . . A15. Each of the audio frames shown in FIG. 9 has a fixed flame size so that there is the same amount of data in each audio frame. The duration of each audio frame is the same. It can be seen from the time line in FIG. 9 that the index duration for the audio data is the same as the index duration of the video data. Using equal index durations or equal index rates for audio data and video data helps to correlate and synchronize the data with each other. However, the present invention is not limited to the use of equal index durations or rates for audio data and video data, and the use of different index rates is contemplated for the present invention.

To ensure that program material data is delivered to a viewer beginning at the start of a GOP, and not just the start of a particular frame, each frame within a GOP maps to the atom-relative byte position of the beginning of that GOP, which is also the beginning of the first frame in that GOP. In an embodiment where the index rate equals the frame rate, every frame within a GOP is assigned a unique index number. The value of the atom-relative byte position corresponding to each of the index numbers of frames within a GOP will be the same, i.e., the atom-relative byte position of the beginning of the first frame in the GOP. As an example (not shown in FIG. 9), assume frames 30 through 40, inclusive, are in the same GOP. Assume further that the index rate is equal to the frame rate so that frames 30 through 40 map to index numbers 30 through 40. The 64-bit byte positions for these eleven index numbers are the same, and point to the beginning of frame 30. As another example, assume index numbers are determined only for every fifth frame. In such a scenario, the index rate is one-fifth the frame rate (and the index duration is five times the frame duration). Again assume frames 30 through 40 are in the same GOP. In this instance, there are index numbers for only frames 30, 35, and 40, and these are index numbers 6 (30/5), 7 (35/5), and 8 (40/5), respectively. The 64-bit byte positions for these three index numbers are the same, and point to the beginning of frame 30.

Another example is illustrated in FIG. 9. Frames F1, F2, F3, and F4 in FIG. 9 are assigned unique index numbers, but each of these index numbers maps to the same atom-relative byte position that is the beginning of GOP1, which is also the beginning of frame F1. Likewise, frames F8, A, F10, and F11 are assigned unique index numbers, but each of these index numbers maps to the same atom-relative byte position that is the beginning of GOP3, which is also the beginning of frame F8. For the MPEG-1 video data shown in FIG. 9, there are 12 unique index numbers, and 12 atom-relative byte positions made up of four sets: the first set contains four rated atom-relative byte positions for frames F1-F4; the second set contains three repeated atom-relative byte positions for F5-F7; the third set contains four repeated atom-relative byte positions F8-F11; and the fourth set contains one atom-relative byte position for F12.

To locate the beginning of the next GOP in an index file, such as for "rounding up", it is thus necessary to look for the next different atom-relative byte position. Rounding down to the beginning of a GOP is accomplished by the use of repeated atom-relative byte positions within the index source. The use of repeated atom-relative byte positions for the frames within a GOP ensures that program material delivered to a viewer starts from the beginning of a GOP. In this example, the GOP represents the decodable data unit. The indexing method of the present invention allows program material to be delivered to a viewer from the beginning of whatever decodable data unit is used.

The indexing method of the present invention correlates between time and media data location. Although the indexing method has been described herein with respect to a particular object hierarchy (i.e., atoms, groups, series, and segments), the present invention is not limited to a particular object hierarchy, or to any particular arrangement of media data. It is to be understood that the indexing method of the present invention can be used in conjunction with other methods of arranging program material as media data.

For example, in a manner analogous to that shown in FIG. 7, program material at a specified point in time can be located by converting the specified time to a time $T_{rel}$ relative to media data that represents the program material. An index number is determined from time $T_{rel}$ using, for example, an index duration. The index number is converted to a data position, thereby locating media data representing the program material at the specified time T. The index duration may be the duration of one frame of media data. The index number may also be rounded to locate an index boundary.

4. Media Stream Synchronization

Audio and video data typically have different frame rates, and therefore, generally have different index rates. Thus, it is necessary to correlate the audio data with the corresponding video data to ensure that the audio and video remain synchronized. The media stream synchronization method of the present invention ensures that the data from every series in a group starts out in synchrony, and remains in synchrony after any repositioning of the viewpoint within the program material. Without synchronization, a viewer would perceive a time delay or offset between the video and the audio. In the preferred embodiment of the present invention, synchronization is done by correlating audio frames of the audio data with GOPs of the video data. As explained more fully below, this minimizes the offset between audio and video data in environments using GOPs. Likewise, closed-captioning text data may also be synchronized with GOPs of the video data in accordance with the present invention.

When jumping to various points in an item of program material, the indexing method of the present invention ensures that a jump is made to the beginning of a GOP. To prevent audio data from being "out of sync", it is necessary to correlate the corresponding audio data to each GOP. To do so, an index file for the video data is constructed first. As discussed above with respect to FIG. 9, an index file for the video data would contain repeated atom-relative byte positions for the frames within GOP1, repeated atom-relative byte positions for the frames within GOF2, repeated atom-relative byte positions for the frames within GOP3, etc. Such a video data index file is then used to construct an index file for the corresponding audio data. An audio data index file is constructed so that, for the set of audio frames that most closely spans the time interval spanned by each GOP, each audio frame in that set is assigned the same atom-relative byte position. The assigned atom-relative byte position is the beginning of the set of audio frames. This synchronization method is illustrated in FIG. 9.

As shown in FIG. 9, GOP1 spans the time interval from $t_1$ to $t_5$. Audio frames A1, A2, A3, A4, and A5 (set I shown in FIG. 9) come closest to spanning this same time interval. In accordance with the synchronization method of the present invention, audio frames A1, A2, A3, A4, and A5 are assigned unique index numbers, but each of these index numbers points to the same atom-relative byte position that is the beginning of audio frame A1. Likewise, GOF2 spans the time interval from $t_5$ to $t_8$. Audio frames A6, A7, A8, and A9 (set II shown in FIG. 9) come closest to spanning this same time interval. In accordance with the synchronization method of the present invention, audio frames A6 through A9 are assigned unique index numbers, but each of these index numbers points to the same atom-relative byte position that is the beginning of audio frame A6. The same methodology would apply so that unique index numbers are assigned to audio frames A10-A15 (set III shown in FIG. 9), but each of these index numbers points to the same atom-relative byte position that is the beginning of audio frame A10. The index numbers and corresponding atom-relative byte positions for the audio are thus selected to most closely match the GOP pattern in the corresponding video.

Using the synchronization method of the present invention, the offset or "out of sync" time between audio and video is generally held to be within one frame duration, typically approximately 1/30 sec. One frame time out of synchrony is within a tolerable limit because a decoder that receives program material from a media provider is typically capable of resynchronizing such an offset. Without the synchronization method of the present invention, the offset time is typically on the order of one GOP duration. Since GOPs can contain on the order of 15 frames, the offset between audio and video without the synchronizing method of the present invention can be on the order of 1/2 sec. Such an offset is not tolerable because a decoder cannot resynchronize at the receiving end. Thus, the present invention helps ensure end-to-end synchrony.

Figure 10:
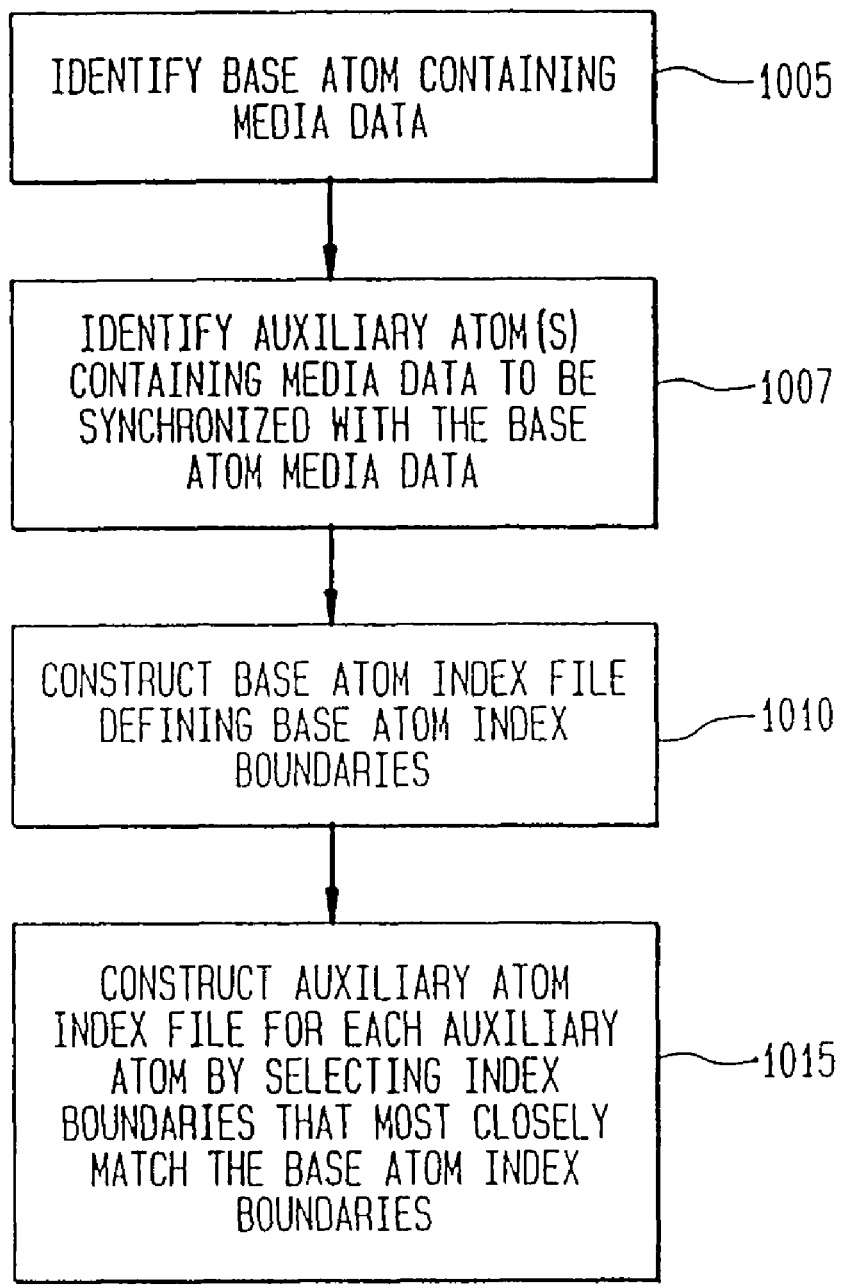
FIG. 10 shows a flow diagram illustrating a process for synchronizing one or more auxiliary atoms containing media data with a base atom containing media data.

The synchronization method described above may be used to correlate any type and any number of atoms of data with each other for synchronized delivery to a viewer. FIG. 10 shows a flow diagram illustrating a process for synchronizing one or more auxiliary atoms containing media data with a base atom containing media data Referring now to FIG. 10, in a step 1005, a base atom containing media data is identified. In a step 1007, one or more auxiliary atoms containing media data to be synchronized with the base atom media data are identified.

In a step 1010, a base atom index file is constructed that defines base atom index boundaries for the base atom. By index boundary is meant a location in the program material to which a viewer is permitted to jump, and at which atom-relative byte position changes to a different value. In the example illustrated in FIG. 9, the index boundaries for a base atom containing MPEG-1 video data are the boundaries defined by the GOPs.

In a step 1015, an auxiliary atom index file is constructed for each auxiliary atom by selecting auxiliary atom index boundaries that most closely match the base atom index boundaries in the base atom index file. In this manner, the media data contained in the auxiliary atoms is synchronized with the media data contained in the base atom. A group can then be created from the base atom and auxiliary atoms. The program material contained in such a group would be delivered to the viewer in a synchronized manner.

For example, a base atom may contain video data with the index file constructed so that the base atom index boundaries are Groups of Pictures (GOP) boundaries as described above. In such a scenario, one of the auxiliary atoms may contain corresponding audio data, and one of the auxiliary atoms may contain corresponding closed-captioning text data. An index file is created for the base atom video data. Index files are created for the audio data and closed-captioning text data by selecting the index boundaries that most closely match the Groups of Pictures boundaries (index boundaries) of the base atom.

In another example, a base atom may contain MPEG-2 encoded audio and video data. In such a scenario, one of the auxiliary atoms may contain the corresponding closed-captioning text data. An index file is created for the base atom audio and video data. An index file is created for the closed-captioning text data by selecting the index boundaries that most closely match the index boundaries of the MPEG-2 base atom data.

In an alternate embodiment, synchronization of audio data and video data can be done "on the fly," without constructing auxiliary atom index files. In such an embodiment, the base atom index source is searched to locate the next different atom-relative byte position. The index number that corresponds to that next different atom-relative byte position is converted to an absolute time (e.g., $T_{movie}$). This absolute time is used to synchronize the auxiliary atoms to the base atom.

In a further embodiment, the present invention is directed to a computer system for indexing media data for delivery to a viewer using the indexing method as described herein. Computer system 602 shown in FIG. 6 is an exemplary computer system. As controllers of computer system 602, computer programs, software, or other computer control logic enables computer system 602 to deliver program material to a viewer from a specified point in time, and in special modes such as pause, still, reverse, etc. Likewise, as controllers of computer system 602, computer programs, software, or other computer control logic enables computer system 602 to synchronize various types of atom data in accordance with the synchronizing method described herein.

Figure 11:
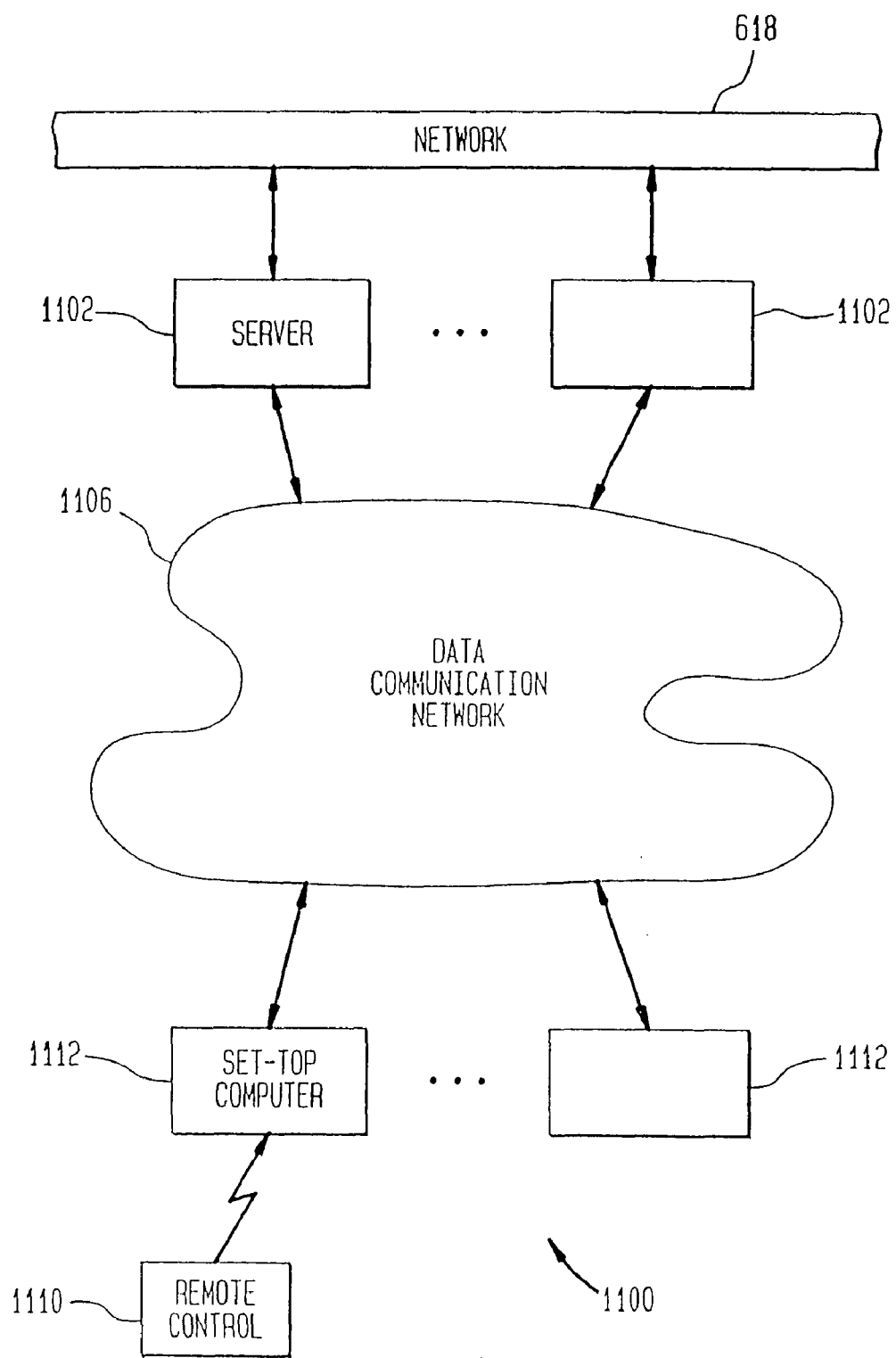
FIG. 11 shows a block diagram of a media delivery system that uses the object hierarchy and indexing and synchronization methods of the present invention for interactive delivery of program material to a television viewer.

In yet a further embodiment, the present invention is directed to a system that uses the object hierarchy and indexing and synchronization methods of the present invention for interactive delivery of program material to a viewer. FIG. 11 shows a block diagram of such a system. Referring now to FIG. 11, a media delivery system 1100 for interactive delivery of program material to a viewer is shown. Media delivery system 1100 includes one or more servers 1102 connected by network 618. Computer system 602 represents one exemplary configuration for server 1102, although other configurations for server 1102 may be used. In a preferred embodiment, servers 1102 are in a location remote from the viewer (viewer not shown).

Servers 1102 are also connected via a data communication or transfer network 1106 to one or more set-top computers 1112. Network 1106 can include, for example, microwave, satellite, cable, or telephone transfer networks, or other types of networks suitable for data communication. In an alternate embodiment, network 618 shown in FIG. 11 can be eliminated so that servers 1102 communicate with each other through network 1106.

Each set-top computer 1112 is the interface between a television (not shown) and media delivery system 1100. A user or viewer controls set-top computer 1112 using a device such as a remote control 1110, thereby interacting with media delivery system 1100 via set-top computer 1112.

In operation, a viewer's command is transmitted to set-top computer 1112 via remote control 1110. Such a command may include, for example, selection of the content of program material (e.g., video, audio, closed-captioning text), or a movement command (e.g., skip to a selected point in the program material or deliver program material in a special mode such as slow-motion or reverse).

The viewer's command is transmitted from set-top computer 1112 via data communication network 1106 for receipt by remote server 1102. Media data representing the program material is arranged in accordance with the viewer's command. For example, a group 218 of media data that corresponds to the viewer's selection of program material may be created. As a further example, the viewer's command may be carried out by indexing to a location in a group 218 that corresponds to the point selected by the viewer. As yet a further example, the viewer's command may be carried out by delivering a group 218 in a special mode, such as fast forward, reverse, etc.

The group 218 media data arranged in accordance with the viewer's command is transmitted from remote servers 1102 via data communication network 1106 to set-top computer 1112. The media data is then decoded, as necessary, by set-top computer 1112 for display on the viewer's television.

Figure 12:
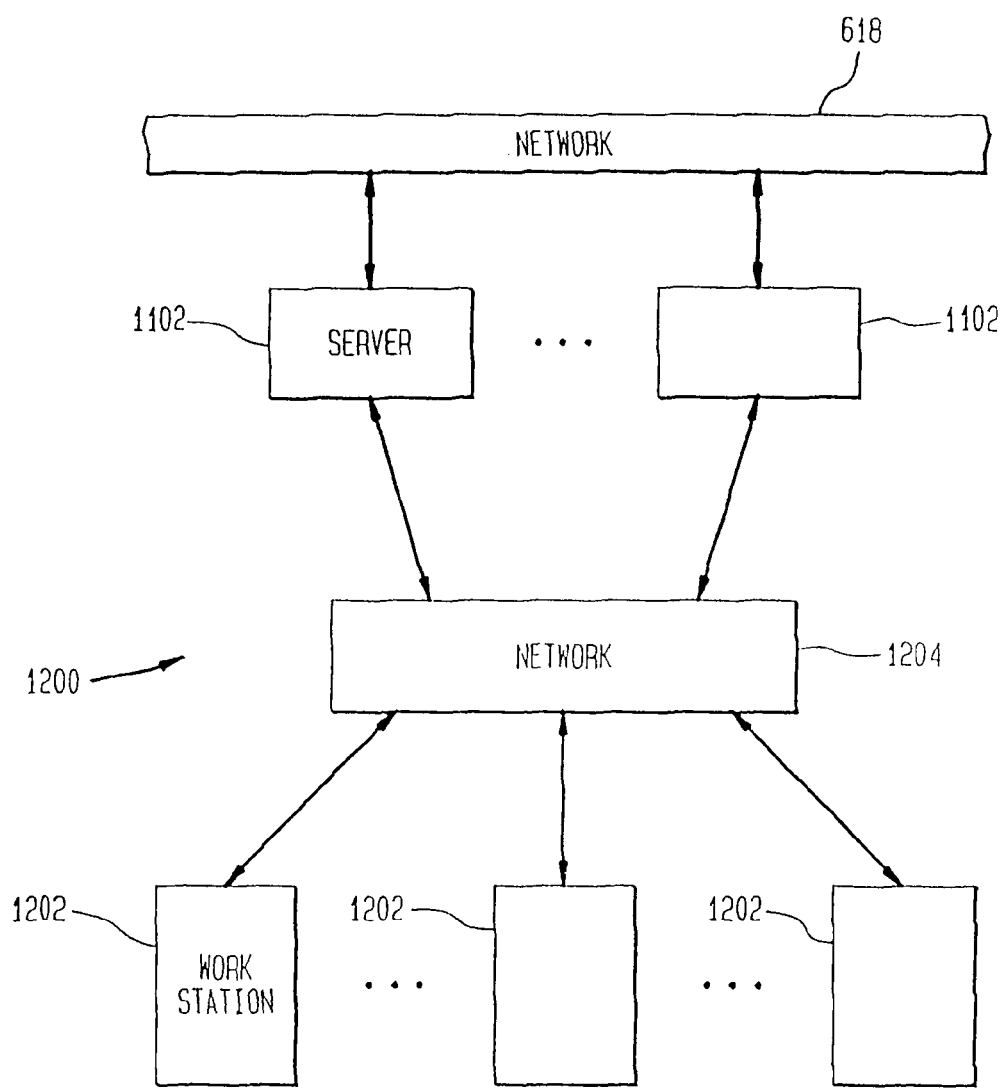
FIG. 12 shows a block diagram of a media delivery system that uses the object hierarchy and indexing and synchronization methods of the present invention for interactive delivery of program material to a workstation.

In yet a further embodiment, the present invention is directed to a system that uses the object hierarchy and indexing and synchronization methods of the present invention for interactive delivery of program material to a workstation. FIG. 12 shows a block diagram of such a system. Referring now to FIG. 12, a media delivery system 1200 for interactive delivery to a workstation is shown. Media delivery system 1200 includes one or more servers 1102 connected by network 618. Servers 1102 are connected via a network 1204 to one or more workstations 1202. In a preferred embodiment, servers 1102 are in a location remote from workstations 1202. Network 1204 can include, for example, microwave, satellite, cable, telephone, or other types of networks suitable for data communication. In an alternate embodiment, network 618 shown in FIG. 12 can be eliminated so that servers 1102 communicate with each other through network 1204.

Workstations 1202 provide the interface between a workstation user (not shown) and media delivery system 1200. Each workstation preferably includes computer means that enable the workstation to perform the following functions: to receive or input a command from the workstation user; to transmit the command over network 1204 to servers 1102; to receive program material from servers 1102; to display a video portion of the program material; and to audibly output an audio portion of the program material for the workstation user. Workstations 1202 may be in locations different from each other.

Media delivery system 1200 is useful in an education environment for providing educational program material to students at the workstations. Media delivery system 1200 is also useful in a business environment to distribute training material, technical or other business information to workstations located throughout a company.

3. Conclusion

While various embodiments of the present invention have been described above, it should be understood that they have been presented by way of example only, and not limitation. For example, the indexing and synchronization methods of the present invention are not limited to the object hierarchy described herein, or to any particular arrangement of media data. Thus, the breadth and scope of the present invention should not be limited by any of the above-described exemplary embodiments, but should be defined only in accordance with the following claims and their equivalents.

We claim:

1. A method for locating program material at a specified time T, comprising:
    converting the specified time T to a time $T_{rel}$, relative to media data representing the program material;
    determining an index number from said time $T_{rel}$ using an index duration;
    converting said index number to a data position, thereby locating media data representing the program material at the specified time T; and
    converting a specified-segment relative time $T_{seg}$ to a specified-atom relative time $T_{atom}$ by adding a specified segment's offset to $T_{seg}$, and computing an index number from $T_{atom}$ using an index duration.

2. The method of claim 1, wherein said index duration is a duration of one frame of media data.

3. The method of claim 1, further comprising: rounding said index number to locate an index boundary.

4. The method of claim 3, wherein said index boundary is a beginning of a frame of media data.

5. The method of claim 3, wherein said index boundary is a beginning of a group of pictures of media data.

6. A method as in claim 1, wherein the method for locating program material comprises locating the program material so that delivery of the program material to a viewer via media delivery on demand begins at the specified time T in the program material.

7. A method as in claim 1, further comprising accessing a group having one or more series, each series having one or more segments that references a corresponding atom containing the media data representing the program material.

8. A method as in claim 7, further comprising determining in which specified segment of which specified atom of media data the specified time T occurs.

9. A method as in claim 8, further comprising converting the specified time T to the specified-segment relative time $T_{seg}$ by calculating an elapsed time into the specified segment at which the specified time occurs.

10. A method as in claim 1, wherein an index file is used to correlate index number with a corresponding data position.

11. A method as in claim 10, wherein the corresponding data positions are the beginning of a frame of media data, or the beginning of a group of media items of media data.

12. A method as in claim 11, wherein the media items include pictures.

13. A computer program product stored on a computer readable medium for use with a computer system and a content on demand media delivery system including computer readable program code for enabling a computer system to carry out the locating of program material so that delivery of the program material to a viewer via media delivery on demand begins at the specified time T in the program material; the computer program product including instructions for:
    converting the specified time T to a time $T_{rel}$ relative to media data representing the program material;
    determining an index number from said time $T_{rel}$ using an index duration;
    converting said index number to a data position, thereby locating media data representing the program material at the specified time T; and
    converting a specified-segment relative time $T_{seg}$ to a specified-atom relative time $T_{atom}$ by adding a specified segment's offset to $T_{seg}$, and computing an index number from $T_{atom}$ using an index duration.

* * * * *